(12) United States Patent
Pola et al.

(10) Patent No.: US 12,044,230 B2
(45) Date of Patent: Jul. 23, 2024

(54) METHODS AND KITS FOR ASSEMBLING A FLOW CAGE ASSEMBLY FOR DOWNHOLE RECIPROCATING PUMP

(71) Applicant: Q2 Artificial Lift Services ULC, Red Deer (CA)

(72) Inventors: Sai Pradeep Pola, Red Deer (CA); Garth John Fraser, Red Deer (CA); Corbin Coyes, Red Deer (CA)

(73) Assignee: Q2 Artificial Lift Services ULC, Red Deer (CA)

(*) Notice: Subject to any disclaimer, the term of this patent is extended or adjusted under 35 U.S.C. 154(b) by 128 days.

(21) Appl. No.: 17/931,403

(22) Filed: Sep. 12, 2022

(65) Prior Publication Data
US 2024/0084792 A1    Mar. 14, 2024

(51) Int. Cl.
| F16K 17/04 | (2006.01) |
| B23P 11/02 | (2006.01) |
| E21B 43/12 | (2006.01) |
| F04B 47/02 | (2006.01) |
| F16K 27/02 | (2006.01) |

(52) U.S. Cl.
CPC .......... F04B 47/026 (2013.01); B23P 11/025 (2013.01); E21B 43/121 (2013.01); F16K 27/0209 (2013.01); F16K 27/0245 (2013.01)

(58) Field of Classification Search
CPC ...... F16K 1/42; F16K 15/021; F16K 27/0209; F16K 15/048; F16K 27/0245; F04B 47/026; B23P 11/025; E21B 43/121
See application file for complete search history.

(56) References Cited

U.S. PATENT DOCUMENTS

| 2,535,320 | A | | 12/1950 | Richardson |
| 5,343,946 | A | * | 9/1994 | Morrill ............... E21B 33/1216 |
| | | | | 166/325 |
| 6,029,685 | A | | 2/2000 | Carruth |
| 7,069,997 | B2 | | 7/2006 | Coyes et al. |
| 8,978,773 | B2 | * | 3/2015 | Tilley .................. E21B 34/142 |
| | | | | 166/194 |
| 11,428,084 | B2 | | 8/2022 | Fraser et al. |
| 11,913,555 | B2 | | 2/2024 | Quinn et al. |
| 2005/0257927 | A1 | | 11/2005 | Coyes et al. |
| 2021/0301621 | A1 | | 9/2021 | Pola et al. |
| 2021/0381338 | A1 | | 12/2021 | Coyes et al. |
| 2022/0120158 | A1 | | 4/2022 | Coyes et al. |
| 2023/0203913 | A1 | * | 6/2023 | Stachowiak, Jr. ...... F04B 47/02 |
| | | | | 137/533.11 |

* cited by examiner

*Primary Examiner* — P. Macade Nichols

(74) *Attorney, Agent, or Firm* — Smith Baluch LLP

(57) ABSTRACT

Methods and kits for assembling a flow cage assembly are provided. The flow cage assembly may be used in a traveling valve, a standing valve, or a top plunger adapter of a downhole reciprocating pump. In some embodiments, the method comprises assembling a body, a tubular insert, and a retaining element such that the retaining element forms an interference fit with the body and thereby securely retains the tubular insert within the body. Top plunger adapters are also provided, assembled from embodiments of the methods and kits.

20 Claims, 18 Drawing Sheets

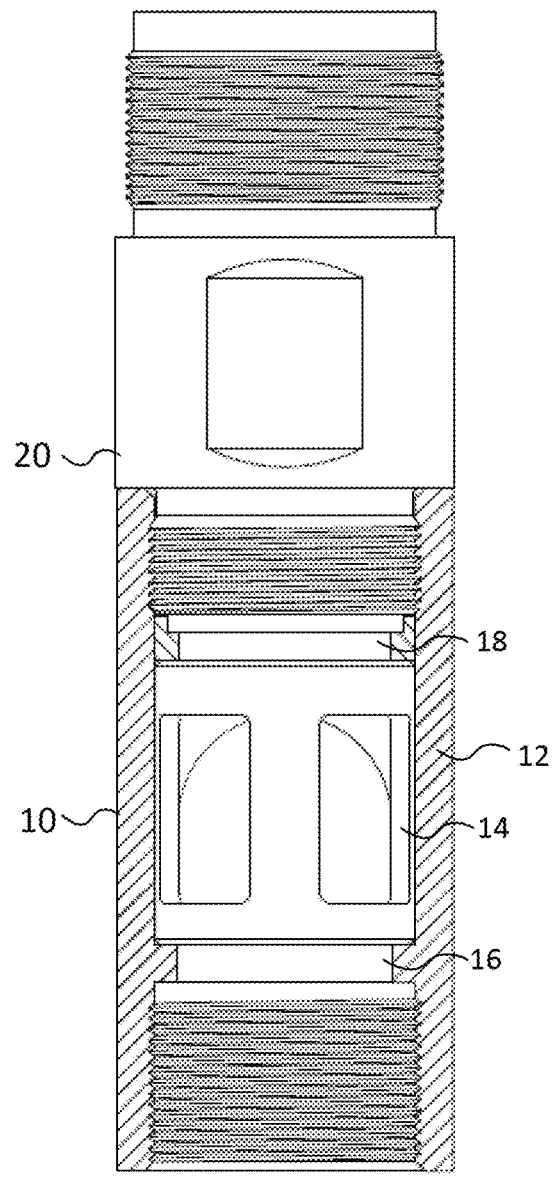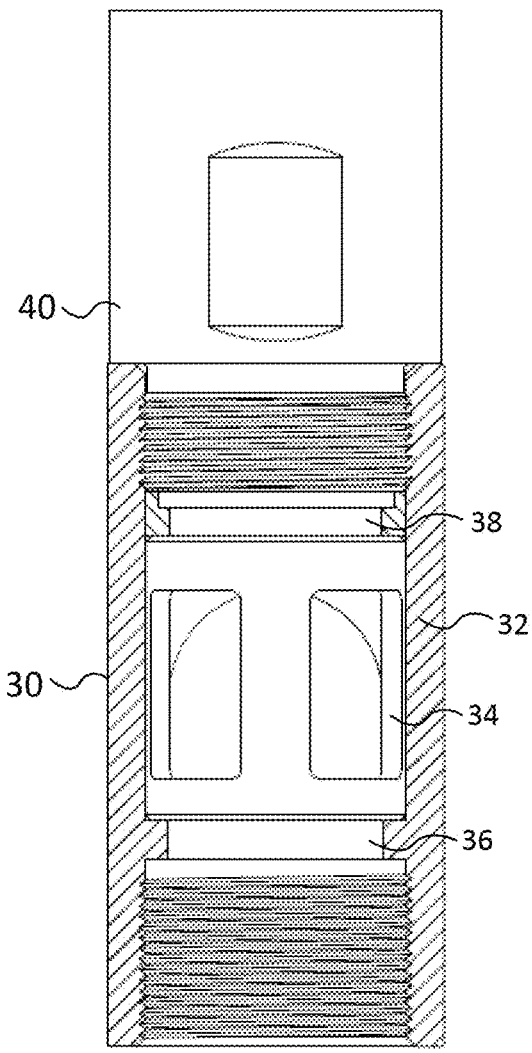
FIG. 1A
(Prior Art)
FIG. 1B
(Prior Art)

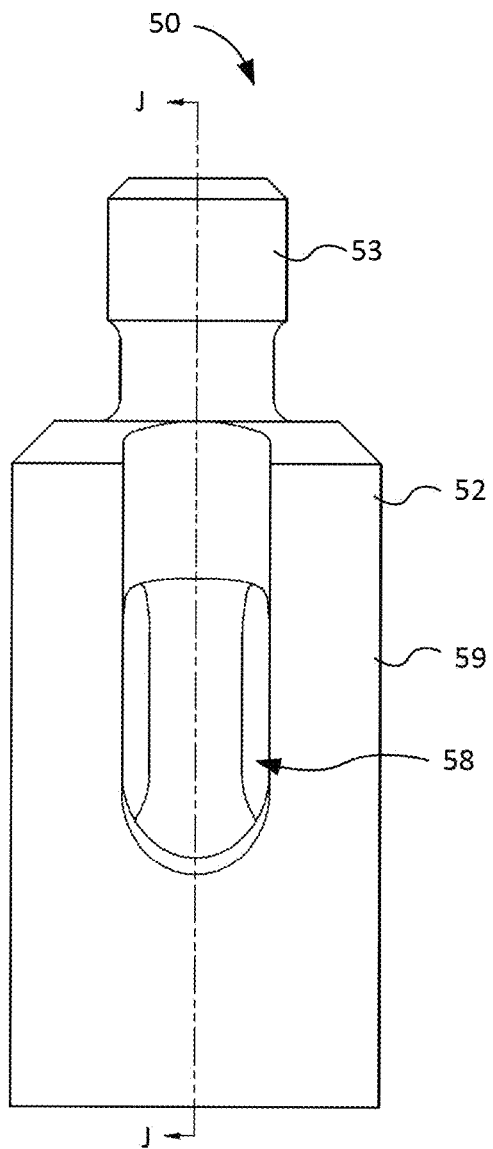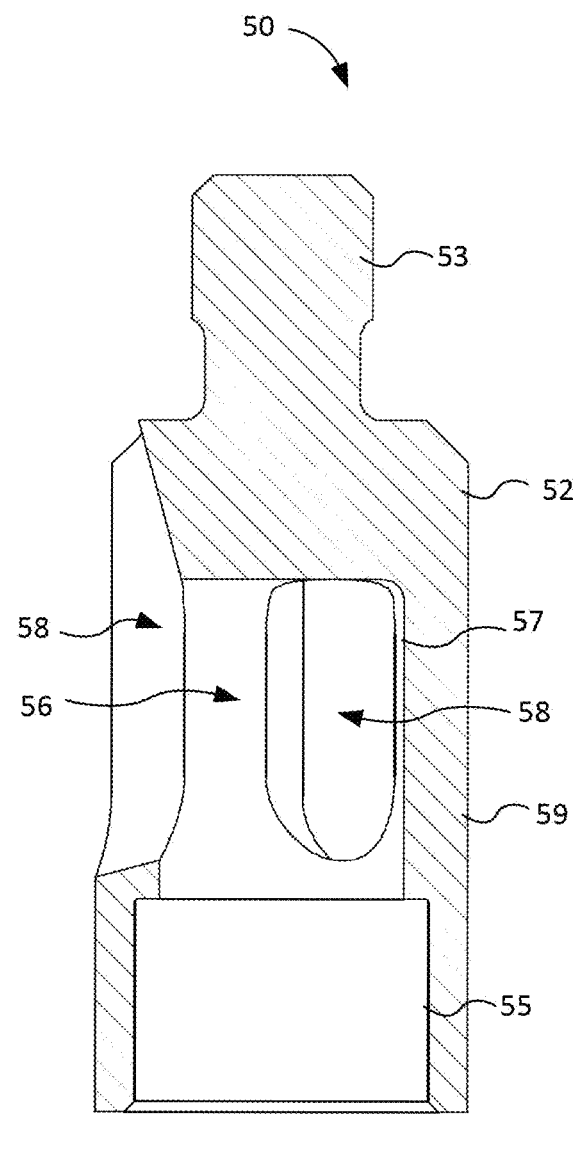
FIG. 1C
(Prior Art)
FIG. 1D
(Prior Art)

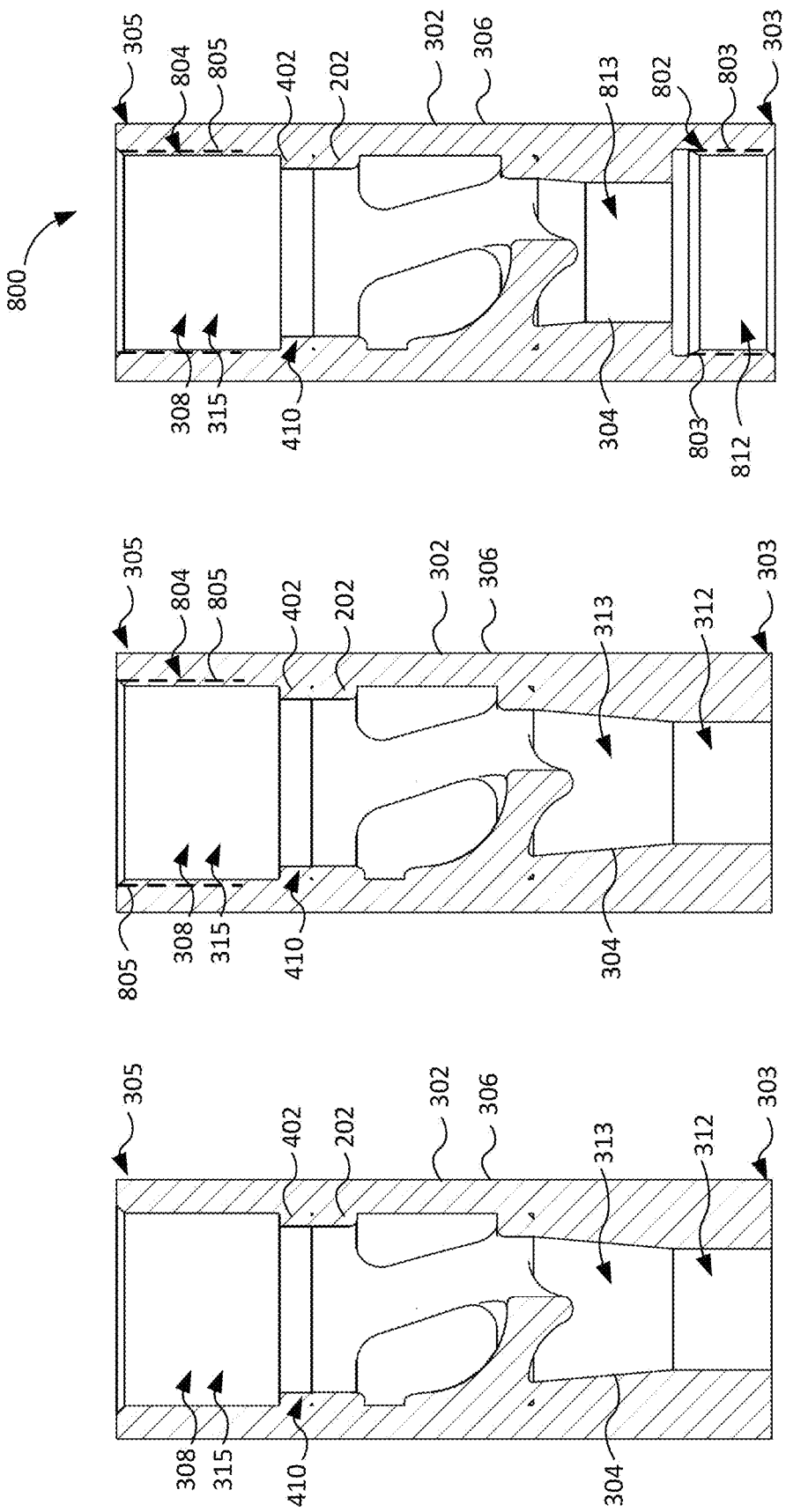

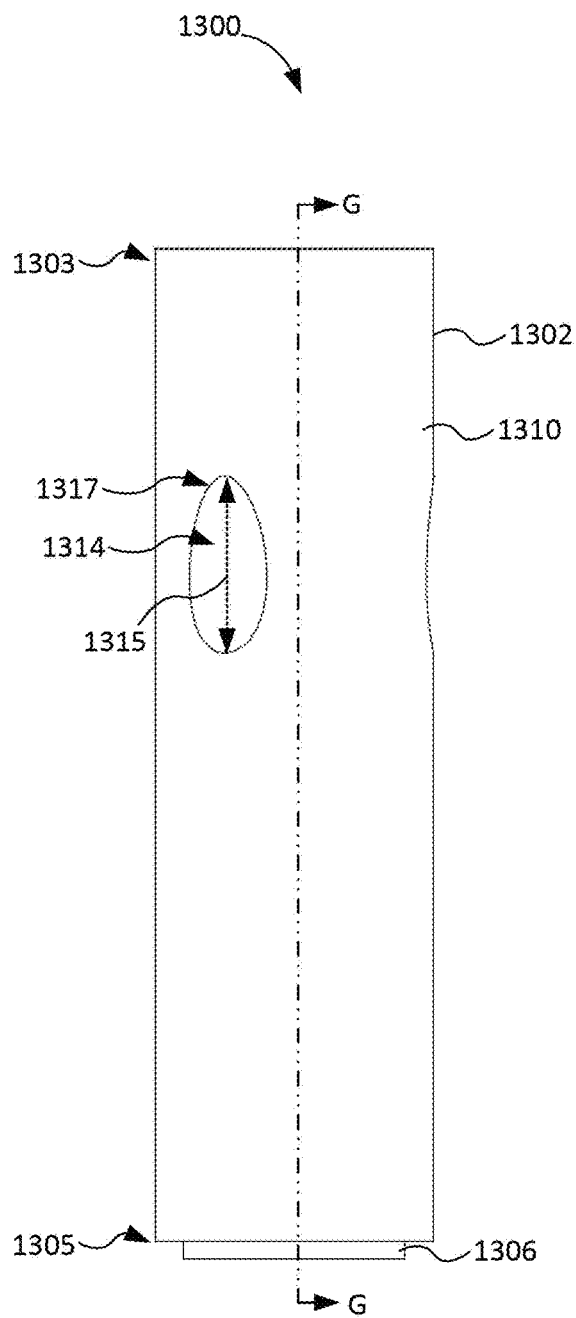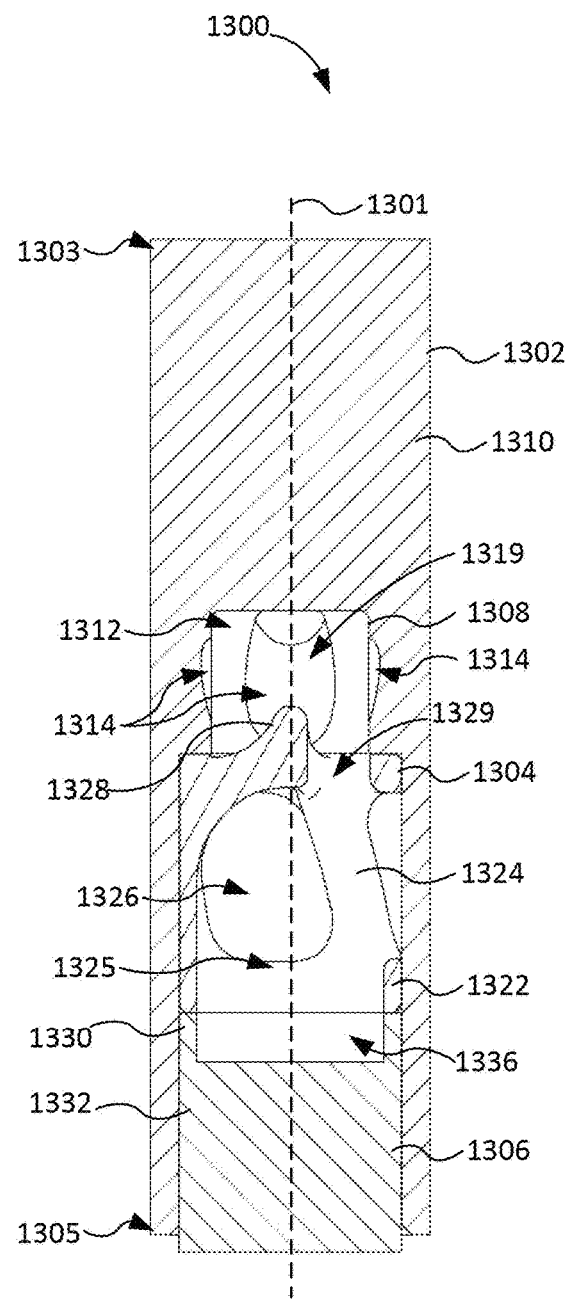
FIG. 13A
FIG. 13B

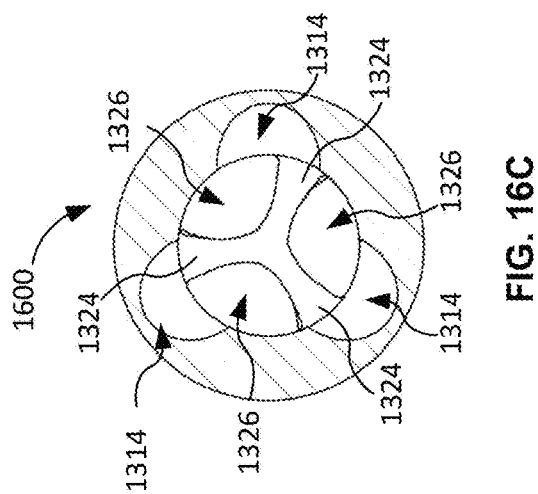
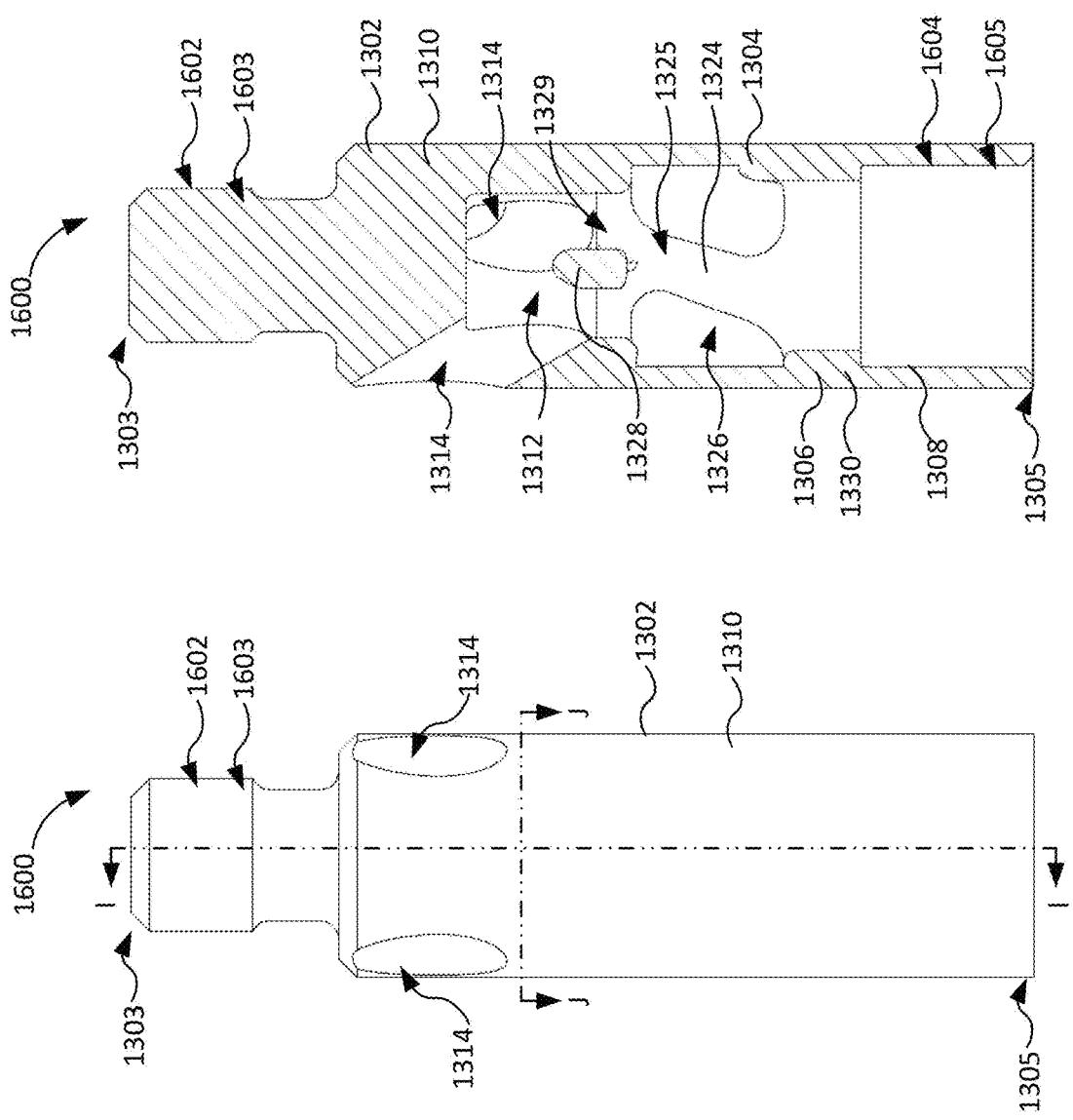
FIG. 16C
FIG. 16B
FIG. 16A

METHODS AND KITS FOR ASSEMBLING A FLOW CAGE ASSEMBLY FOR DOWNHOLE RECIPROCATING PUMP

TECHNICAL FIELD

The present disclosure relates to artificial lift systems such as reciprocating downhole pumps. More particularly, the present disclosure relates to methods and kits for assembling flow cage assemblies for a downhole reciprocating pump.

BACKGROUND

In hydrocarbon recovery operations, an artificial lift system is typically used to recover fluids from a well in a subterranean earth formation. Common artificial lift systems include reciprocating pumps such as sucker rod pumps. The pump may generally comprise a plunger disposed within a barrel and a valve system. The plunger is moved up and down within the barrel in order to draw fluids to the surface. More particularly, the plunger may be coupled to a lower end of a reciprocating rod or rod string, for example. The rod string may be referred to as a "sucker rod."

The valve system may include a standing valve and a travelling valve. The standing valve may be positioned at the bottom of the barrel, and the travelling valve may be coupled to a bottom end of the plunger. On the downstroke, pressure differentials may close the standing valve and open the travelling valve. Fluids in the barrel may thereby pass upward through the travelling valve and plunger during the downstroke. On the upstroke, reversed pressure differentials may close the travelling valve and open the standing valve. Fluids above the travelling valve maybe moved upward by motion of the plunger, and fluids from the earth formation or reservoir may enter the barrel (below the plunger) via the standing valve.

The standing valve and the travelling valve may each be a respective ball check valve. A ball check valve may comprise a ball in a flow cage assembly that can move between a first position in which flow is blocked and a second position in which fluid may flow through the cage. Typically, in a flow blocking position, the valve ball sits on a ball seat (such as a ring) and blocks fluid flow through an opening in the ball seat.

For improved durability in the downhole environment, some flow cage assemblies comprise an external tubular body or "shell" assembled with an internal insert. The insert, which is repeatedly impacted by the ball during use, can be made of a hard, durable material such as cobalt or another suitable material. The body can be made of a material having greater tensile strength such as steel, as it experiences greater axial compression and tensile forces due to reciprocation of the rod string. The flow cage assembly may also comprise a ball seat made of the same material as the insert.

Examples of conventional insert-type flow cage assemblies are shown in FIGS. 1A and 1B.

FIG. 1A is a side, partial cross-sectional view of an example conventional flow cage assembly 10 configured for a standing valve. The flow cage assembly 10 is shown assembled with a top bushing 20. The top bushing 20 is configured to connect at its uphole end to the downhole end of a barrel (not shown). The flow cage assembly 10 comprises a body 12, an insert 14, a ball seat 16, and a sealing member 18. The insert 14 is configured to receive a valve ball (not shown) therein.

The sealing member 18 forms a seal between the insert 14 and the top bushing 20 to prevent leaks at the threaded connection between the flow cage assembly 10 and the top bushing 20. However, the repeated axial and lateral movement of the valve ball within the insert 14 can cause wear to the sealing member 18. As the sealing member 18 is typically made of rubber or another relatively soft material, it presents a potential failure point at which leaks may still occur. In addition, the threaded connection decreases the thickness of the wall of the body 12, providing another weak point vulnerable to cracking and fatigue.

FIG. 1B is a side, partial cross-sectional view of an example flow cage assembly 30 configured for a traveling valve. The flow cage assembly 30 is shown assembled with a top bushing 40. The top bushing 40 is configured to connect at its uphole end to the downhole end of a plunger (not shown). Similar to the flow cage assembly 10 of FIG. 1A, the flow cage assembly 30 comprises a body 32, an insert 34, a ball seat 36, and a sealing member 38. The sealing member 38 forms a seal between the insert 34 and the top bushing 40. The sealing member 38 presents a potential failure point in a similar manner to the sealing member 18 of the flow cage assembly 10 as discussed above.

An alternative flow cage design comprises a screw-in ball seat bushing configured to threadingly couple with internal threads formed in the inner wall of the body. However, fluid leaks between the threads of the seat and the body can result in erosive wear of the threads, which in turn can result in loosening of the connection between the seat and body.

Another alternative flow cage design is described in U.S. Pat. No. 6,029,685 in which a top bushing is friction welded to the body to retain the insert therein. Such a cage design eliminates the potential leak point between the body and the top bushing, negating the need for a sealing member therebetween. However, the friction weld joining the body and top bushing presents a potential weak point, as the material around the weld may be weakened, for example due to embrittling of the surrounding material, porosities created by the weld, and the like.

Some reciprocating pumps include a top plunger adapter or connector between the uphole end of the plunger and the downhole end of the sucker rod. The adapter may itself comprise a flow cage that allows fluid to flow therethrough. However, top plunger adapter flow cages are typically simple structures with an internal chamber and side ports or slots to allow fluid to flow therethrough.

FIGS. 1C and 1D are side and cross-sectional views, respectively, of an example top plunger adapter 50. The adapter 50 comprises a body 52 with an upper connector portion 53 and a lower connector portion 55 (visible in FIG. 1D). The upper connector portion 53 is configured to engage a downhole end of a sucker rod or valve rod (not shown) and the lower connector portion 55 is configured to engage an uphole end of a plunger (not shown).

The body 52 itself may form a flow cage for fluid to flow through the adapter 50. Referring to FIG. 1D, the body 52 has an inner wall 57 and an outer wall 59. The body 52 comprises an axial chamber 56 defined by the inner wall 57 and a plurality of side slots 58 extending between the inner wall 57 and the outer wall 59 and providing fluid communication between the axial chamber 56 and the exterior of the adapter 50. The slots 58 are elongated in shape and are drilled approximately horizontally from the outer wall 59 to the inner wall 57. The slots 58 are approximately axially aligned with the axial chamber 56. Fluid from the plunger may thereby flow uphole through the axial chamber 46 and the slots 58 and into the barrel of the pump.

However, adapters such as the adapter 50 may be prone to wear and damage as fluid flows through the body 52 and may not provide sufficient fluid control through the barrel surrounding the plunger.

SUMMARY

In one aspect, there is provided a method for assembling a flow cage assembly for a top plunger adapter, the method comprising: providing a body having an axial chamber and a plurality of side ports extending through the body into the axial chamber, wherein the axial chamber has a first diameter and is expandable to a second diameter when the body is heated; providing a tubular insert, the tubular insert receivable into the axial chamber; providing a retaining element, the retaining element receivable into the axial chamber and having an outer diameter between the first and second diameters; heating the body such that the axial chamber expands to the second diameter; inserting the tubular insert into the axial chamber; inserting the retaining element into the axial chamber such that the retaining element abuts the tubular insert; and cooling the body such that the body and the retaining element form an interference fit.

In some embodiments, the tubular insert comprises a plurality of ribs defining a plurality of side openings, and wherein inserting the tubular insert into the axial chamber further comprises positioning the tubular insert such that each of the plurality of ribs is offset from a respective side port of the plurality of side ports.

In some embodiments, the body has an outer wall and an inner wall and wherein each side port of the plurality of side ports is angled downward from the outer wall to the inner wall.

In some embodiments, the retaining element comprises an annular portion and a plug portion.

In some embodiments, the plug portion is integral with the annular portion, the annular portion abutting the tubular insert.

In some embodiments, the plug portion is separate from the annular portion, and wherein inserting the retaining element into the axial chamber comprises inserting the annular portion and inserting the plug portion such that the plug portion abuts the annular portion.

In some embodiments, the method further comprises using the plug portion to manipulate the positioning of the retaining element in the axial chamber.

In some embodiments, the method further comprises removing the plug portion after the interference fit has been formed such that only the annular portion remains.

In some embodiments, removing the plug portion comprises machining the plug portion out of the axial chamber.

In some embodiments, the body is heated to a temperature of between about 500° F. and about 900° F. for about 3 minutes to about 10 minutes.

In some embodiments, the body has an uphole end and a downhole end, and the uphole end faces downwards while the tubular insert and the retaining element are inserted and the interference fit is formed.

In some embodiments, the method further comprises forming an upper connector portion and a lower connector portion in the body, the upper connector portion connectable to a sucker rod or a valve rod and the lower connector portion connectable to a plunger.

In another aspect, there is provided a top plunger adapter comprising: a flow cage assembly comprising: a body having an axial chamber and a plurality of side ports extending through the body into the axial chamber; a tubular insert received within the axial chamber, the tubular insert defining an axial flow passage therethrough; and a retaining element received within the axial chamber below the tubular insert, the retaining element forming an interference fit with the body.

In some embodiments, the top plunger adapter further comprises a valve ball received within the axial flow passage of the tubular insert; a ball seat received within the axial chamber of the body, below the retaining element.

In some embodiments, the tubular insert comprises a plurality of ribs defining a plurality of side openings, and the tubular insert is positioned in the axial chamber such that each of the plurality of ribs is offset from a respective side port of the plurality of side ports.

In some embodiments, the body has an outer wall and an inner wall and each side port of the plurality of side ports is angled downward from the outer wall to the inner wall.

In another aspect, there is provided a kit for assembling a top plunger adapter, comprising: a body having an axial chamber and a plurality of side ports extending through the body into the axial chamber, wherein the axial chamber has a first diameter and is expandable to a second diameter when the body is heated; a tubular insert receivable into the axial chamber of the body; and a retaining element having an outer diameter between the first diameter and the second diameter, the retaining element comprising an annular portion and a plug portion.

In some embodiments, the plug portion is integral with the annular portion.

In some embodiments, the plug portion is separate from the annular portion.

In some embodiments, the kit further comprises a valve ball and a ball seat, the valve ball receivable into the tubular insert and the ball seat receivable into the axial chamber.

Other aspects and features of the present disclosure will become apparent, to those ordinarily skilled in the art, upon review of the following description of specific embodiments of the disclosure.

BRIEF DESCRIPTION OF THE DRAWINGS

Some aspects of the disclosure will now be described in greater detail with reference to the accompanying drawings. In the drawings:

FIG. 1A is a side, partial cross-sectional view of a prior art flow cage assembly configured for a standing valve, shown assembled with a top bushing;

FIG. 1B is a side, partial cross-sectional view of a prior art flow cage assembly configured for a traveling valve, shown assembled with a top bushing;

FIG. 1C is a side view of a prior art top plunger adapter;

FIG. 1D is a cross-sectional view of the top plunger adapter taken along line J-J in FIG. 1C;

FIGS. 8A-8C are cross-sectional views of an example flow cage assembly produced from the assembled kit of FIGS. 7A-7B, shown at various stages of machining;

FIG. 13A is a side view of an example kit for assembling a flow cage assembly for a top plunger adapter, shown assembled, according to some embodiments;

FIG. 13B is a cross-sectional view of the assembled kit taken along line G-G in FIG. 13A;

FIG. 16A is a side view of a flow cage assembly produced using the kit of FIGS. 13A-13B and the method of FIGS. 15A and 15B, according to some embodiments;

FIG. 16B is a cross-sectional view of the flow cage assembly taken along line I-I of FIG. 16A;

FIG. 16C is a cross-sectional view of the flow cage assembly taken along line J-J in FIG. 16A.

DETAILED DESCRIPTION

Generally, the present disclosure provides a method for assembling a flow cage assembly. The flow cage assembly may be used to assemble a traveling valve, a standing valve, or a top plunger adapter. A related kit is also provided herein. The kit may comprise a body having an axial bore or chamber, a tubular insert, and a retaining element. The kit may be assembled such that the retaining element forms an interference fit with the body and thereby retains the tubular insert within the axial bore or chamber.

As used herein and in the appended claims, the singular forms of "a", "an" and "the" include plural referents unless the context clearly dictates otherwise.

In this disclosure, the "uphole" direction refers to the direction toward the surface in a well or borehole. The "downhole" direction refers to the direction toward the bottom of the well or borehole (i.e. opposite to the uphole direction). The terms "upward" and "downward" may be used to refer to the "uphole" and "downhole" directions, respectively, unless the context dictates otherwise.

The term "downhole pump" refers to any pumping system positioned within a well or borehole for pumping fluids or other materials to the surface. The term "reciprocating downhole pump" refers to any pump system in which one or more components reciprocates within the well for moving fluids or other materials uphole, such as downhole pump comprising a reciprocating plunger in a barrel.

The term "standing valve" refers to a valve positioned at or near the bottom of the barrel or corresponding structure of the downhole pump. The term "traveling valve" refers to a valve that travels with the plunger or other reciprocating component of the downhole pump.

The term "insert-type flow cage assembly" refers to a flow cage comprising an outer tubular body or "shell" and an inner tubular insert configured to receive a valve ball therein.

An example kit 100 for assembling a flow cage assembly will be described with reference to FIGS. 2A to 5B (the complete kit 100 is visible in FIGS. 5A and 5B). The kit 100 may be used to implement embodiments of the methods described herein.

Figure 3A:
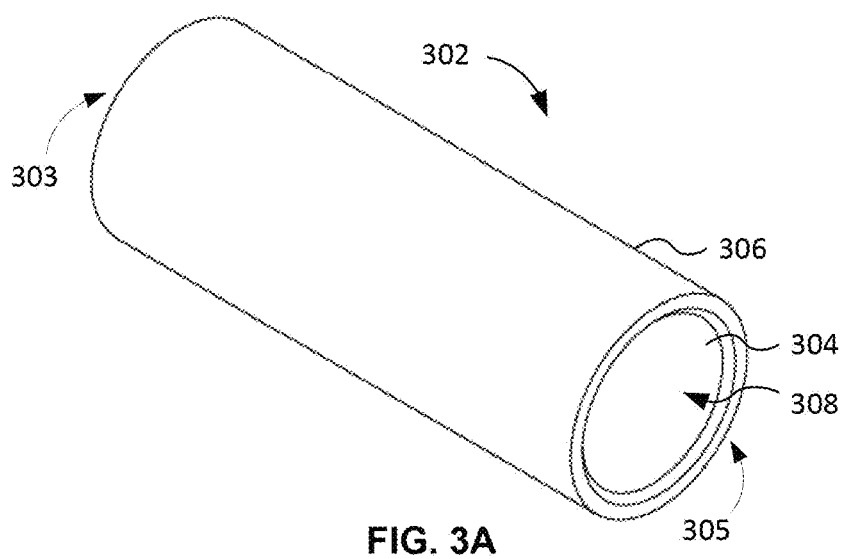
FIGS. 3A and 3B are perspective and side views, respectively, of a tubular body, according to some embodiments.
Figure 3B:
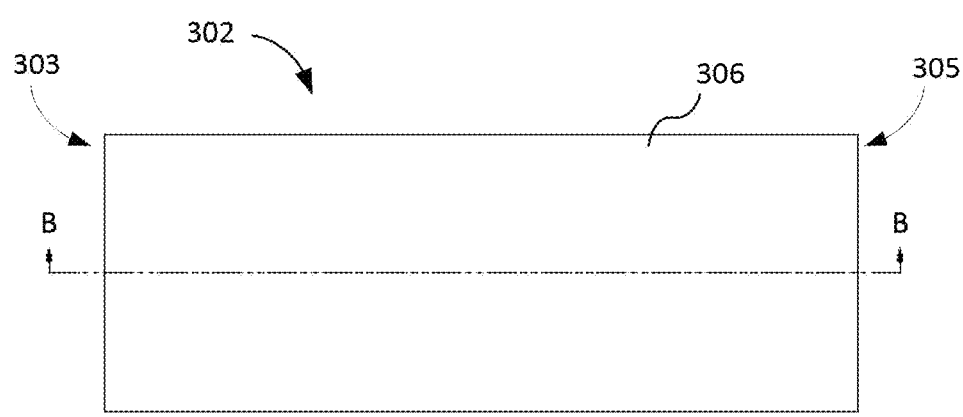
Figure 3C:
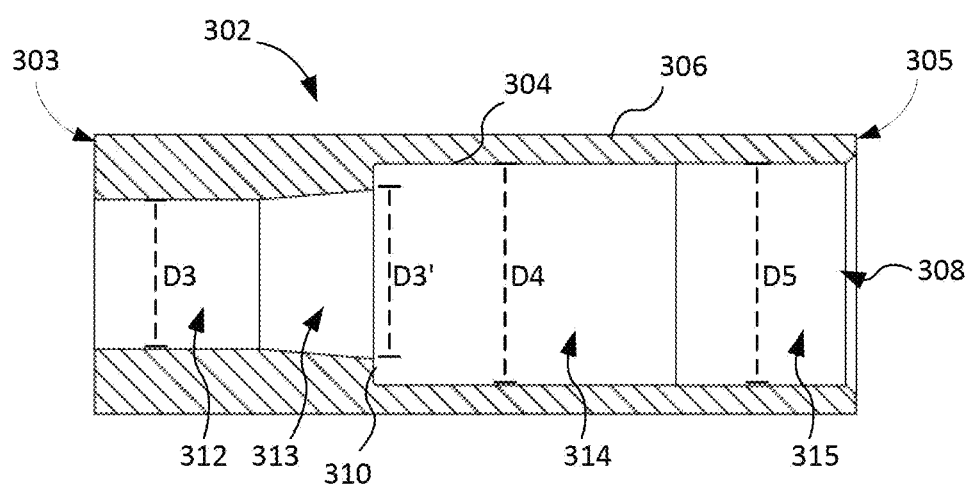
FIG. 3C is a cross-sectional view of the tubular body, taken along line B-B in FIG. 3B.
Figure 4A:
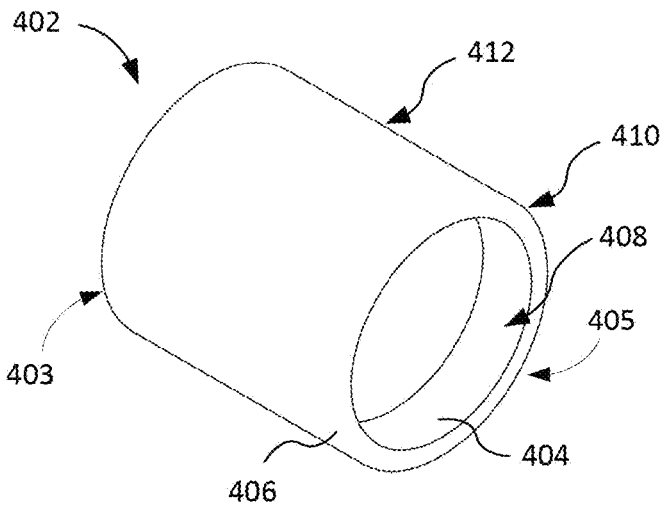
FIGS. 4A and 4B are perspective and side views, respectively, of a retaining element, according to some embodiments.
Figure 4B:
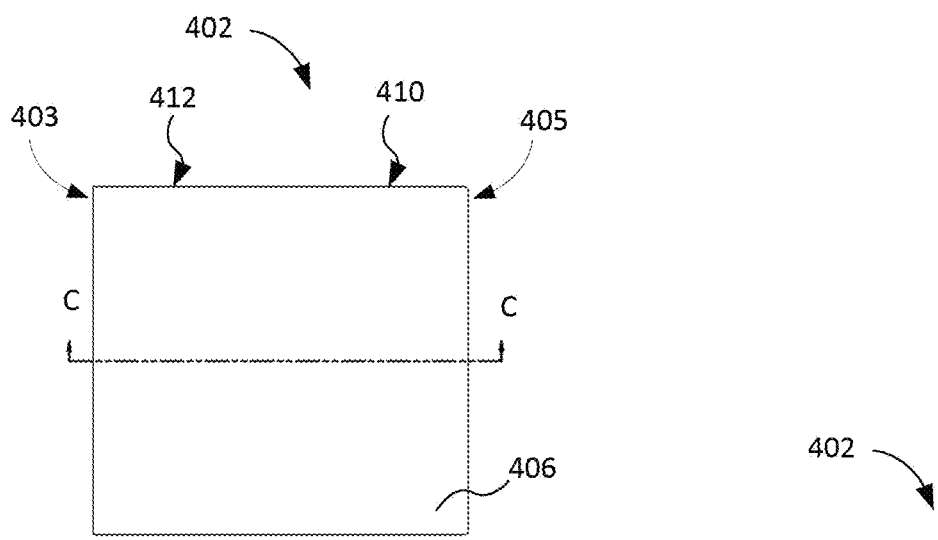
Figure 4C:
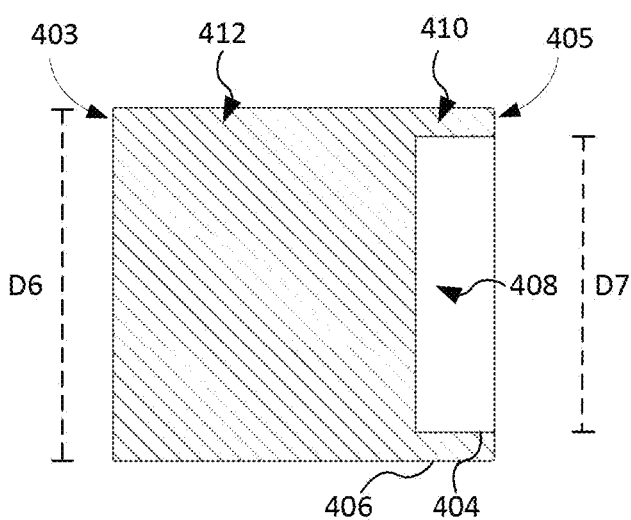
FIG. 4C is a cross-sectional view of the retaining element, taken along line C-C in FIG. 4B.

The kit 100 in this embodiment comprises a tubular insert 202 (shown in FIGS. 2A-2B), a tubular body or shell 302 (shown in FIGS. 3A-3C) and a retaining element 402 (shown in FIGS. 4A-4C).

Figure 2A:
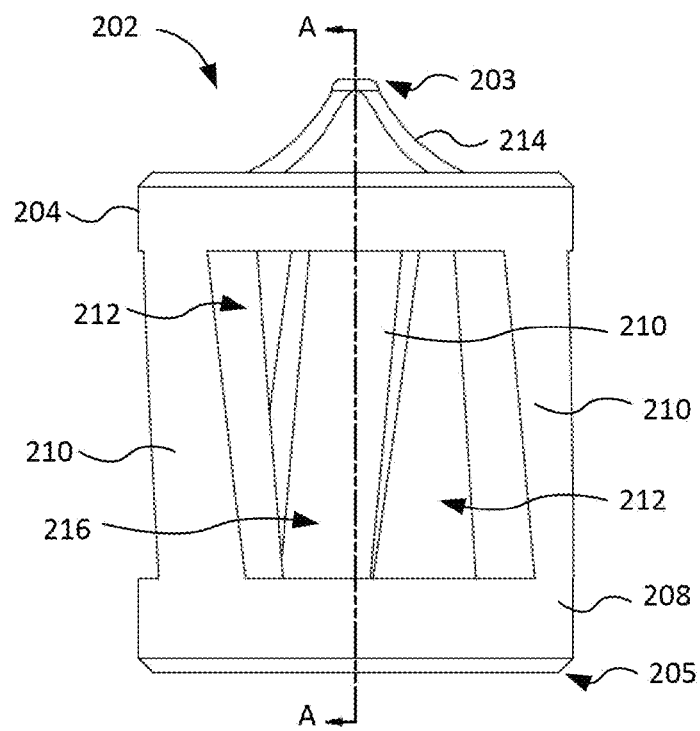
FIG. 2A is a side view of a tubular insert, according to some embodiments.
Figure 2B:
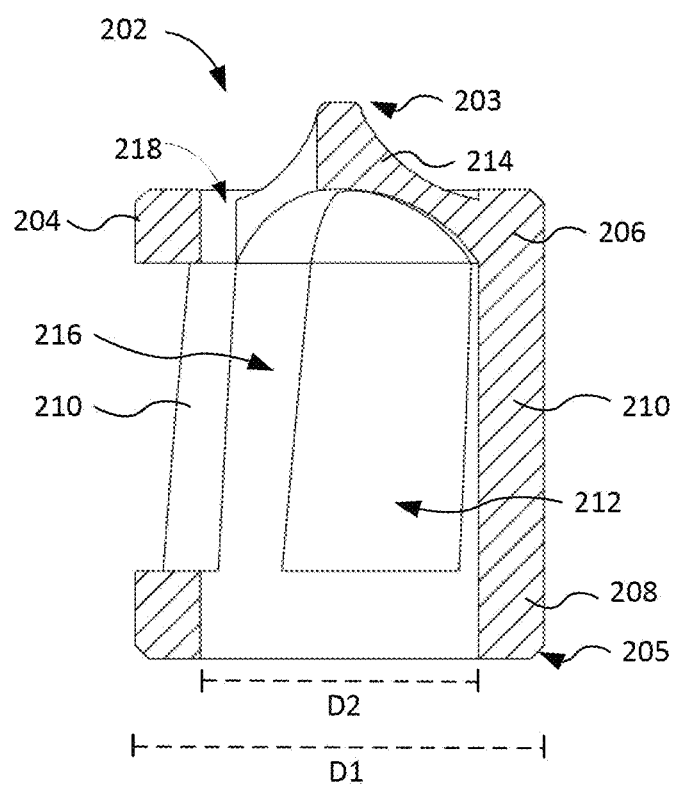
FIG. 2B is a cross-sectional view of the tubular insert taken along line A-A in FIG. 2A.

Referring to FIGS. 2A and 2B, the insert 202 in this embodiment comprises a generally tubular body 206 and has an uphole end 203 and a downhole end 205. The uphole end 203 is an outlet end and the downhole end 205 is an inlet end. The body 206 defines an axial flow passage 216 therethrough from the uphole end 203 to the downhole end 205.

As shown in FIG. 2B, the body 206 of the insert 202 has an outer diameter D1 and the axial flow passage 216 has a diameter D2 at the downhole end 205 of the insert 202. The diameter D2 is a suitable diameter to receive a valve ball (not shown) into the axial flow passage 216. The diameter D1 is a suitable diameter such that the insert 202 may be received into the tubular body 302, as described in more detail below.

The body 206 of the insert 202 comprises an upper ring 204 and a lower ring 208 with a plurality of circumferentially spaced ribs 210 therebetween. The ribs 210 define a plurality of side openings 212. In this embodiment, the ribs 210 are angled such that each of the side openings 212 extends along a substantially helical path. Thus, incoming fluid is induced to adopt a helical flow pattern as it moves through the insert 202, thereby creating a centrifugal effect. In other embodiments, the ribs may be relatively straight and thereby define substantially vertical side openings, similar to the inserts 14 and 34 of FIGS. 1A and 1B, respectively.

As shown in FIG. 2B, the body 206 further comprises a central ball stop 214 that extends upwards past the upper ring 204. The side openings 212 extend through the upper ring 204 to form outlet openings 218 disposed circumferentially around the ball stop 214.

In some embodiments, the insert 202 is comprised of a relatively hard and durable material. In some embodiments, the insert 202 is comprised of cobalt. In other embodiments, the insert 202 is comprised of any other suitable material.

Referring to FIGS. 3A to 3C, the tubular body or shell 302 in this embodiment is approximately cylindrical in shape and has an uphole end 303 and a downhole end 305. The uphole end 303 is an outlet end and the downhole end 305 is an inlet end. The tubular body 302 has an inner wall 304 and an outer wall 306. The inner wall 304 defines an axial bore 308 extending through the tubular body 302 from the uphole end 303 to the downhole end 305 (the axial bore 308 is visible in FIGS. 3A and 3C).

As shown in FIG. 3C, the inner wall 304 of the tubular body 302 defines an annular shoulder 310 extending radially inward into the axial bore 308. The axial bore 308 comprises a first upper section 312 and a second upper section 313 uphole of the annular shoulder 310. The axial bore 308 further comprises a first lower section 314 and a second lower section 315 downhole of the annular shoulder 310.

The first upper section 312 has a diameter D3. The diameter D3 of the first upper section 312 may be selected to allow the tubular body 302 to engage a suitable uphole component of a plunger or barrel of a downhole pump. In this embodiment, the second upper section 313 is tapered from the first upper section 312 toward the annular shoulder 310 such that its diameter increases from diameter D3 to its widest diameter D3' proximate the annular shoulder 310. The tapering of the second upper section 313 may provide a gradual transition of fluid flowing uphole from the first lower section 314 to the first upper section 312. In other embodiments, the second upper section 313 is not tapered and its diameter is approximately the same as the diameter D3 of the first upper section 312.

The first lower section 314 has a diameter D4 and the second lower section 315 has a diameter D5. The diameter D4 is a suitable diameter such that the tubular insert 202 may be received into the first lower section 314 of the axial bore 308. In some embodiments, the diameter D4 is approximately the same as the outer diameter D1 of the insert 202 such that the insert 202 fits snugly into the first lower section 314. The diameter D5 of the second lower section 315 may be slightly greater than the diameter D4. In some embodiments, the diameter D5 is the same or similar to the outer diameter D6 of the retaining element 402 as described in more detail below.

In this embodiment, the diameter D4 of the first lower section 314 is greater than the diameter D3 of the first upper section 312, with the tapered second upper section 313 providing a gradual transition therebetween. The differences in the diameter of the inner wall 304 at the first lower section 314 and the second upper section 313 thereby forms the annular shoulder 310 therebetween. In other embodiments, the annular shoulder 310 comprises an annular protrusion extending from the inner wall 304 of the body 302. In these embodiments, the diameter D3 may be approximately the same as the diameter D4.

In some embodiments, the tubular body 302 is comprised of a material with relatively high tensile strength. In some embodiments, the tubular body 302 is comprised of alloy steel, monel, or stainless steel. In other embodiments, the tubular body 302 comprises any other suitable material.

Referring to FIGS. 4A to 4C, the retaining element 402 in this embodiment is generally cylindrical in shape and has an uphole end 403 and a downhole end 405.

The retaining element 402 comprises a plug portion 412 proximate the uphole end 403 and an annular portion 410 proximate the downhole end 405. In this embodiment, the plug portion 412 is integral with the annular portion 410. In other embodiments, the plug portion 412 is separate from the annular portion 410. In yet other embodiments, the plug portion 412 is omitted and the retaining element 402 only comprises the annular portion 410.

In this embodiment, the plug portion 412 is substantially solid. Alternatively, the plug portion 412 may be tubular with an axial bore extending all or partially therethrough (not shown).

As shown in FIG. 4C, the retaining element 402 comprises an outer wall 406 that extends the length of the retaining element 402 and an inner wall 404 that extends the length of the annular portion 410. The inner wall 404 defines an opening 408 in the annular portion 410 at the downhole end 405.

The retaining element 402 has an outer diameter D6 defined by the outer wall 406 and the annular portion 410 has an inner diameter D7 defined by the inner wall 404. The outer diameter D6 may be slightly greater than the diameter D4 of the first lower section 314 of the axial bore 308 of the tubular body 302. In some embodiments, the outer diameter D6 is approximately equal to the diameter D5 of the second lower section 315. The difference between the outer diameter D6 and the D4 of the first lower section 314 allows the annular portion 410 of the retaining element 402 to form an interference fit with the tubular body 302, as described in more detail below. In some embodiments, the interference is between about 0.001 to about 0.0025 inches per inch of diameter. The allowance per inch may decrease as the diameter D4 of the axial bore increases. For the range of valve cage sizes for pump bores, which are typically about 1 inch to about 6 inches in diameter, the interference may be between about 0.001 to about 0.013 inches. However, a person skilled in the art would understand that the design interference may be lower or higher than this range.

The inner diameter D7 of the annular portion 410 is at least the diameter of the valve ball (not shown) to allow the valve ball to be inserted through the opening 408 and into the axial flow passage 216 of the insert 202. In some embodiments, the inner diameter D7 is approximately equal to the diameter D2 of the axial flow passage 216 (at downhole end 205) of the insert 202.

In some embodiments, the retaining element 402 is comprised of the same material as the tubular body 302. In some embodiments, the retaining element 402 is comprised of alloy steel, monel, or stainless steel. In other embodiments, the retaining element 402 is comprised of any other suitable material.

Figure 5A:
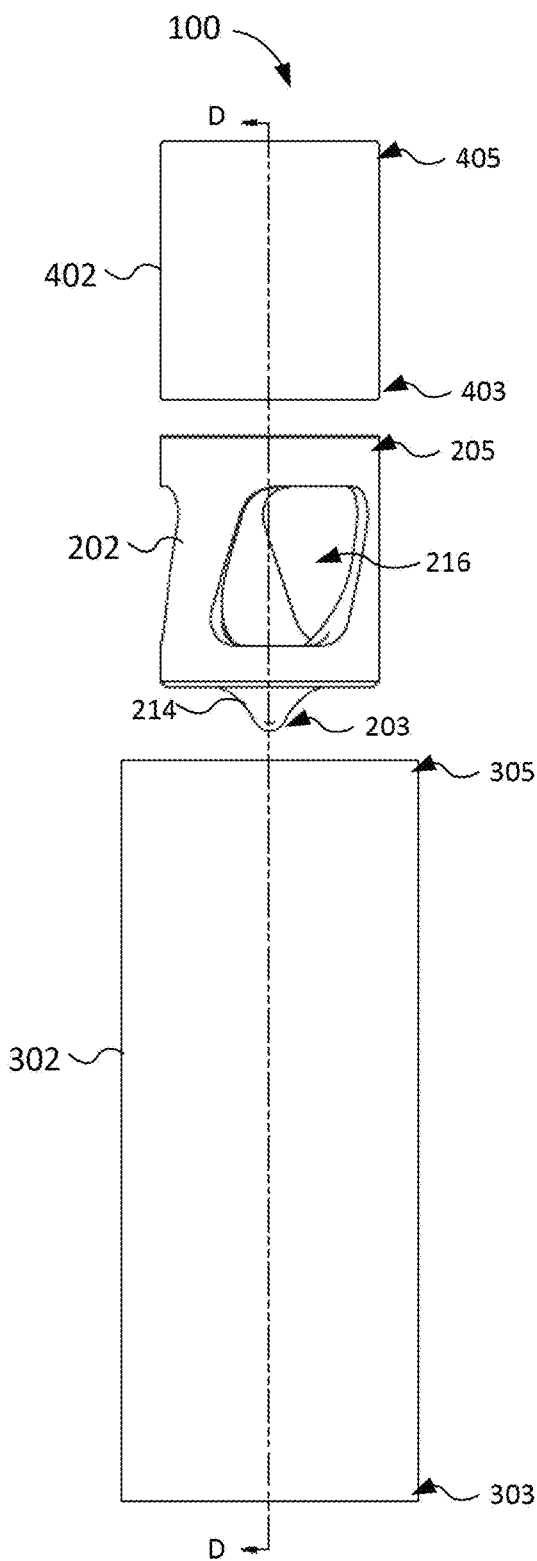
FIG. 5A is an exploded view of a kit comprising the tubular insert of FIGS. 2A-2B, the tubular body of FIGS. 3A-3C, and the retaining element of FIGS. 4A-4C.
Figure 5B:
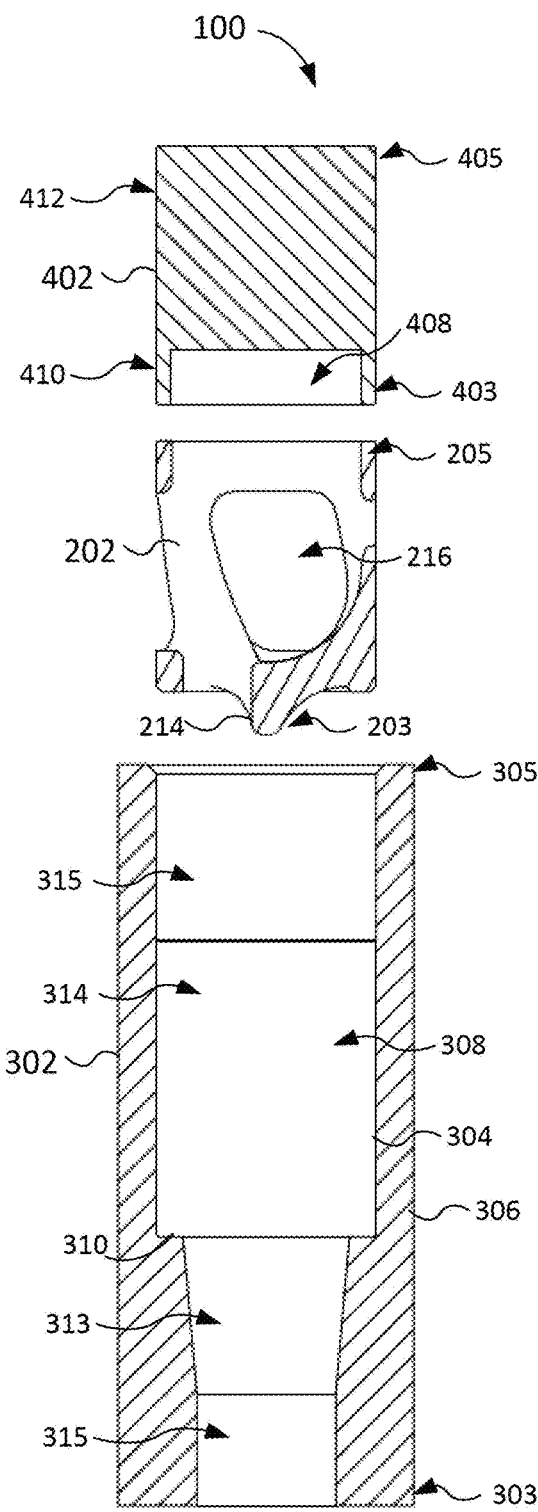
FIG. 5B is a cross-sectional view of the kit, taken along line D-D in FIG. 5A.

FIGS. 5A and 5B are exploded side and perspective views, respectively, of the kit 100 including the insert 202, the tubular body 302, and the retaining element 402. FIGS. 5A and 5B show the kit 100 in an orientation ready for assembly, with the insert 202, the tubular body 302, and the retaining element 402 axially aligned and their respective uphole ends 203, 303, and 403 facing in the same direction. The assembly of the kit 100 will be discussed in more detail below.

Figure 6A:
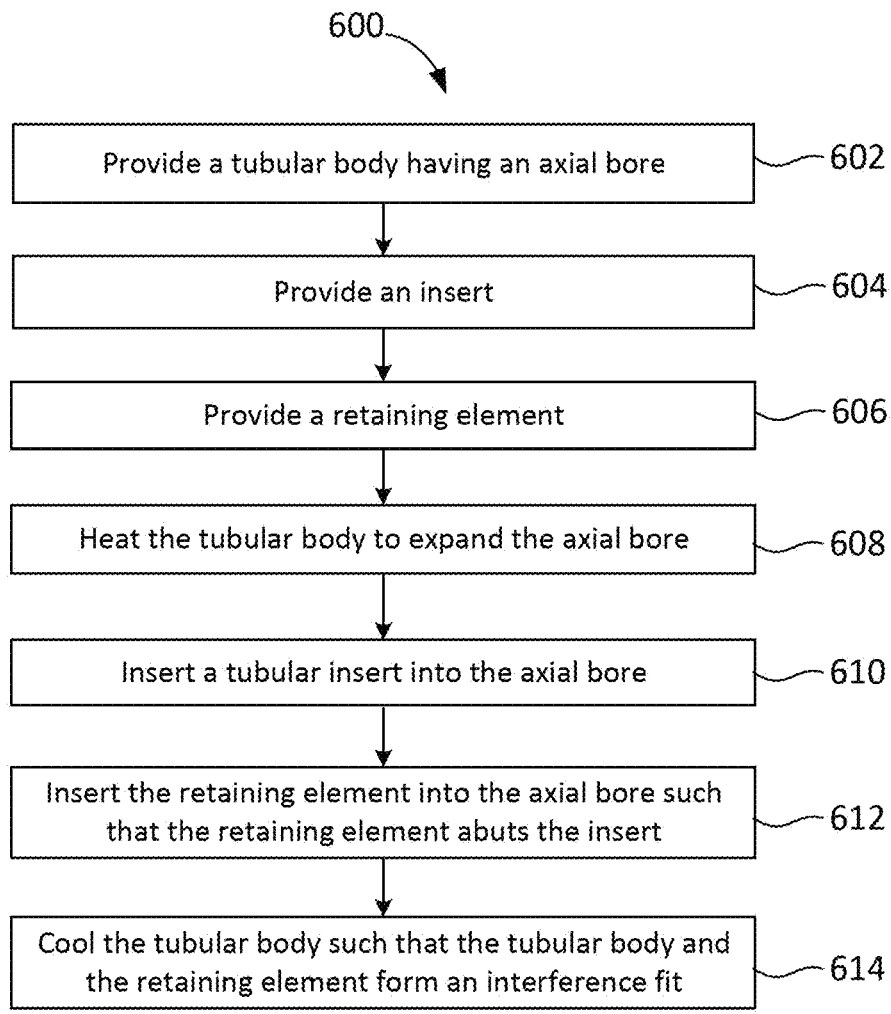
FIG. 6A is a flowchart of an example method for assembling a flow cage assembly, according to some embodiments.

FIG. 6A is a flowchart of an example method 600 for assembling a flow cage assembly, according to some embodiments. The method 600 may be implemented using the kit 100.

At block 602, a tubular body is provided. As used herein, "providing" in this context refers to making, buying, acquiring, or otherwise obtaining one of the components described herein. The tubular body comprises an axial bore having a first diameter. In this example, the tubular body is the tubular body 302 having the axial bore 308 as described above. The first diameter is the diameter D4 of the first lower section 314 of the axial bore 308. The first lower section 314 of the axial bore 308 is expandable to a second diameter (not shown) when the tubular body 302 is heated, as described in more detail at block 608 below.

At block 604, an insert is provided, the insert receivable into the axial bore of the tubular body. The insert comprises an axial flow passage to receive a valve ball therein. In this example, the insert is the insert 202 with the axial flow passage 216, as described above.

At block 606, a retaining element is provided, the retaining element having an outer diameter that is between the first diameter and the second diameter of the axial bore. The retaining element in this example is the retaining element 402 having outer diameter D6. In this embodiment, the retaining element 402 and the tubular body 302 are made of the same material such as, for example, alloy steel, monel, or stainless steel.

At block 608, the tubular body 302 is heated to expand the axial bore 308 to the second diameter. In some embodiments, the tubular body 302 is heated to expand the axial bore 308 such that the second diameter is at least about 0.001 to 0.0025 inches (per inch of diameter) greater than the first diameter D4. For the range of valve cage sizes for pump bores from about 1 to 6 inches, the second diameter may be at least about 0.001 to 0.013 inches greater than the first diameter D4. In other embodiments, the second diameter may be any suitable other diameter greater than the first diameter D4.

The tubular body 302 may be heated by any suitable heating mechanism. In some embodiments, the tubular body 302 is heated by placing the tubular body 302 in an oven at the desired temperature. The temperature and heating time may be selected based on the size and geometry (e.g. diameter) of the tubular body 302 as well as the material it comprises and the coefficient of thermal expansion of that material. The temperature and heating time may be limited to prevent unintended tempering of a given material, which is specific to the alloy and metallurgical conditions of the materials used. In some embodiments, the tubular body 302 is heated to a temperature between about 500° F. (about 260° C.) to about 900° F. (approximately 482° C.). In some embodiments, the tubular body 302 is heated to approximately 900° F. (approximately 482° C.). In some embodiments, the tubular body 302 is heated for about 3 minutes to about 10 minutes. In some embodiments, the tubular body 302 is heated for about 5 minutes to about 7 minutes. In other embodiments, a suitable temperature and heating time may be determined by one skilled in the art based on known formulas, published material properties, and/or empirical trials. Embodiments are not limited to the specific temperatures and times disclosed herein.

The tubular body 302 is then removed from the oven for use at block 610. In some embodiments, the steps at block 610 are performed almost immediately after the steps of block 608, or within a few minutes, to avoid significant cooling of the tubular body 302 until block 614 described below.

At block 610, the tubular insert 202 is inserted into the axial bore 308 of the tubular body 302. The tubular insert 202 may be at room temperature prior to insertion into the tubular body 302. As used herein, "room temperature" or "ambient temperature" refers to a temperature of a temperature-controlled building or environment. For example, room temperature may be between about 15° C. and about 30° C. or between about 19° C. and about 25° C.

In some embodiments, the tubular body 302 is positioned with its uphole end 303 facing downwards and the insert 202 is inserted into the tubular body 302 with its own uphole end 203 facing downwards (i.e. opposite to how the tubular body 302 and the insert 202 would be positioned in a downhole pump). The insert 202 may be inserted such that the upper ring 204 abuts the annular shoulder 310 of the tubular body 302.

At block 612, the retaining element 402 is inserted into the axial bore 308 of the tubular body 302. In some embodiments, the retaining element 402 is at room temperature prior to insertion into the tubular body 302. In other embodiments, the retaining element 402 is cooled prior to insertion. For example, the retaining element 402 may be cooled a few degrees by placing the retaining element 402 in cooling device, such as a refrigerator or freezer, for a suitable period of time. Alternatively, the retaining element 402 may be cooled using dry ice, liquid nitrogen, or the like.

The retaining element 402 may be inserted into the tubular body 302 with its uphole end 403 facing downwards. The retaining element 402 may be inserted such that the retaining element 402 abuts the tubular insert 202. More particularly, the retaining element 402 may be inserted such that the annular portion 410 abuts the downhole end 205 of the insert 202. The opening 408 may therefore be approximately axially aligned with the axial flow passage 216 at the downhole end 205 of the insert 202. When the retaining element 402 is inserted into the axial bore 308, the annular portion 410 is received into the first lower section 314 and the plug portion 412 is received into the second lower section 315 of the axial bore 308. In this embodiment, the plug portion 412 is integral with the annular portion 410. In other embodiments, the plug portion 412 is separate from the annular portion 410 and the annular portion 410 is inserted into the axial bore 308 first, followed by insertion of the plug portion 412.

Figure 7A:
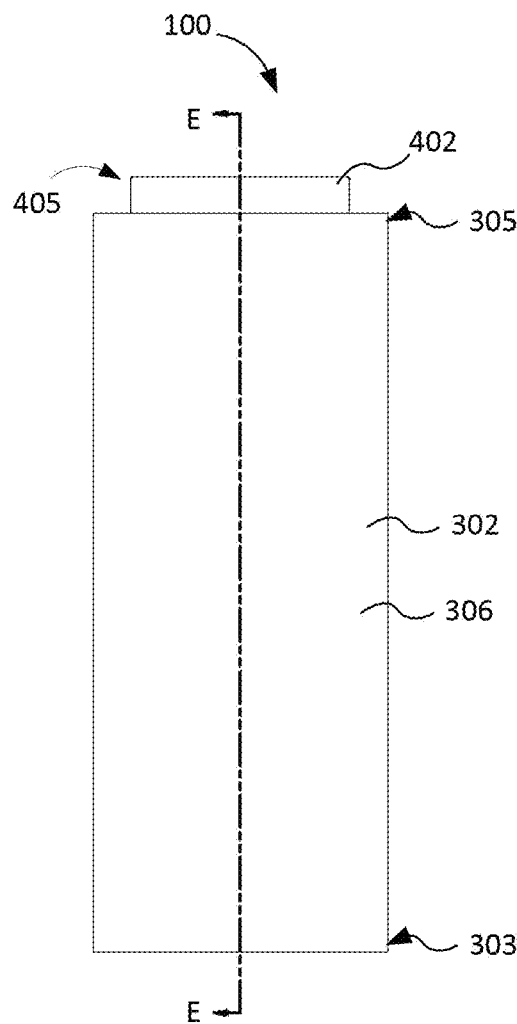
FIG. 7A is a side view of the kit of FIGS. 5A and 5B assembled by the method of FIG. 6A, according to some embodiments.
Figure 7B:
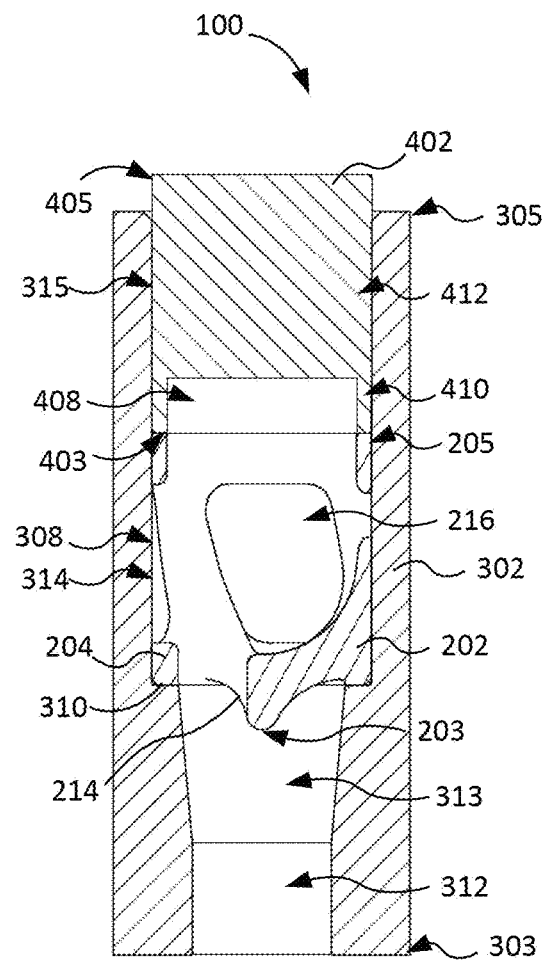
FIG. 7B is a cross-sectional view of the assembled kit taken along line E-E in FIG. 7A.

In some embodiments, the plug portion 412 of the retaining element 402 is longer than the second lower section 315 of the axial bore 308. The plug portion 412 may thereby extend longitudinally beyond the downhole end 305 of the tubular body 302 when the retaining element 402 is received in the axial bore 308 (as shown in FIGS. 7A and 7B, discussed below). The plug portion 412 may thereby be used to manipulate the retaining element 402 to position the retaining element 402 in the axial bore 308 of the tubular body 302. For example, an operator may grip the plug portion 412 by hand or with a pair of tongs to position the retaining element 402. The retaining element 402 may be positioned such that the annular portion 410 abuts the insert 202 and the opening 408 is axially aligned with the axial flow passage 216. The weight of the plug portion 412 may help to maintain the positioning of the retaining element 402 and the insert 202 by pressing the annular portion 410 against the insert 202 and the insert 202 against the annular shoulder 310 of the tubular body 302.

In this embodiment, the retaining element 402 is inserted to directly abut the insert 202. However, in other embodiments, a ball seat (such as ball seat 1104 or 1204 shown in FIGS. 11 and 12) is inserted following insertion of the insert 202 at block 610 and then the retaining element 402 is inserted to abut the ball seat. In these embodiments, the retaining element 402 retains both the insert 202 and the ball seat in the axial bore 308.

At block 614, the tubular body 302 is cooled such that the tubular body 302 and the retaining element 402 form an interference fit. In some embodiments, the tubular body 302 is cooled by allowing the tubular body 302 to sit at room temperature. In other embodiments, the tubular body 302 is cooled in a cooling device including, for example, a refrigerator or freezer. Alternatively, the tubular body 302 may be cooled using dry ice, liquid nitrogen, or the like.

In this embodiment, only the annular portion 410 of the retaining element 402 forms an interference fit with the tubular body 302 whereas the plug portion 412 does not. In other embodiments, the entire retaining element 402 forms an interference fit with the tubular body 302. The retaining element 402 thereby securely retains the insert 202 in the axial bore 308 of the tubular body 302.

FIGS. 7A and 7B show the kit 100 assembled by the method 600 of FIG. 6A.

As shown in FIG. 7B, when the kit 100 is assembled, the insert 202 is received into the first lower section 314 of the axial bore 308 of the tubular body 302 such that the upper ring 204 abuts the annular shoulder 310. The ball stop 214 of the insert 202 extends into the second upper section 313 of the axial bore 308.

The retaining element 402 is received into the axial bore 308 such that the annular portion 410 abuts the downhole end 205 of the insert 202. The opening 408 of the retaining element 402 is thereby approximately aligned with the axial flow passage 216 of the insert 202. When the retaining element 402 is inserted into the axial bore 308, the annular portion 410 is received into the first lower section 314 and the plug portion 412 is received into the second lower section 315 of the axial bore 308. In this embodiment, the plug portion 412 of the retaining element 402 is longer than the second lower section 315 of the axial bore and thus extends longitudinally beyond the downhole end 305 of the tubular body 302. This configuration may facilitate the positioning of the retaining element 402 in the axial bore 308 as discussed above.

In this embodiment, the annular portion 410 of the retaining element 402 forms an interference fit with the tubular body 302 due to the difference between the outer diameter D6 of the retaining element 402 and the diameter D4 of the first lower section 314 of the axial bore 308. In this embodiment, the plug portion 412 does not form an interference fit with the tubular body 302 due to the slightly greater diameter D5 of the second lower section 315 compared to the diameter D4 of the first lower section 324. Thus, the plug portion 412 may be easily removed, as described in more detail below. However, as the diameter D5 is only slightly greater than the diameter D4, the axial alignment of the annular portion 410 and the insert 202 is not lost while the interference fit is being formed.

When the interference fit is formed between the annular portion 410 of the retaining element 402 and the tubular body 302, the outer wall 406 of the annular portion 410 is substantially sealed against the inner wall 304 of the tubular body 302 and the annular portion 410 cannot be slidably moved or rotated within the axial bore 308. The annular portion 410 thereby secures the insert 202 within the axial bore 308 between the annular portion 410 and the annular shoulder 310 of the tubular body 302.

Therefore, in some embodiments, the interference fit between the annular portion 410 and the tubular body 302 eliminates the need for a sealing member to retain the insert 202 within the tubular body 302 and may thereby reduce or eliminate a possible failure point.

Figure 6B:
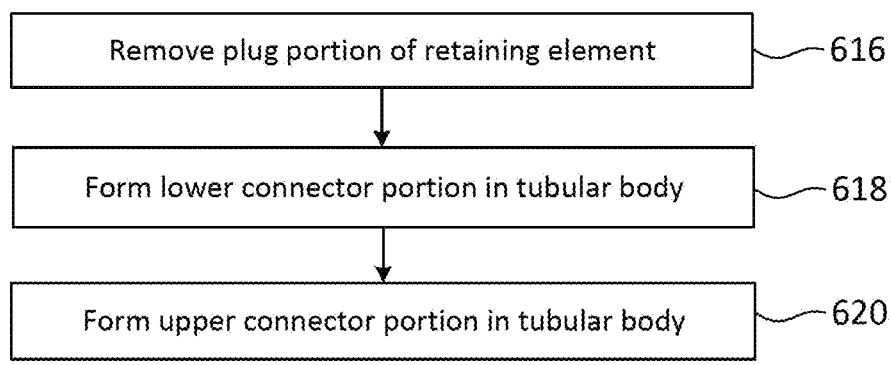
FIG. 6B is a flowchart showing additional steps to the method of FIG. 6A.

FIG. 6B is a flowchart showing additional steps to the method 600 of FIG. 6A.

At block 616, the plug portion 412 of the retaining element 402 is removed. With the plug portion 412 removed, only the annular portion 410 remains and the opening 408 extends fully through the annular portion 410.

In this embodiment, the plug portion 412 is integral with the annular portion 410 and the plug portion 412 is removed by machining the plug portion 412 out of the second lower section 315 of the axial bore 308 of the tubular body 302. As used herein, "machining" refers to use of a machine to selectively remove material from a body. The plug portion 412 may be machined using a chucking machine, a drilling machine, a grinding machine, a broaching machine, or any other suitable type of machine. It will be understood that "removing" the plug portion 412 refers to removing substantially the entire plug portion 412, although it is possible that traces may still remain after machining.

In other embodiments, where the plug portion 412 is a separate component from the annular portion 410, the plug portion 412 may be removed by sliding the plug portion 412 out of the axial bore 308. For example, the plug portion 412 may be slid out of the axial bore 308 by hand or using a pair of tongs.

In other embodiments, where the retaining element 402 only comprises an annular portion 410, and not the plug portion 412, the steps at block 616 may be omitted.

At block 618, a lower connector portion is formed in the tubular body 302. The lower connector portion may be proximate the downhole end 305 of the tubular body 302. The lower connector portion may be configured to engage a seat bushing, a plug seat, or any other suitable component of a downhole pump that may be positioned downhole of the tubular body 302.

In some embodiments, the lower connector portion is formed in the inner wall 304 or outer wall 306 of the tubular body 302. The lower connector portion may be formed by machining or any other suitable method. In some embodiments, the lower connector portion comprises a threaded section that threadingly engages a complementary threaded section in seat bushing, plug seat, or other component. In other embodiments, the lower connector portion comprises any other suitable structure to facilitate connection to another component of a downhole pump and embodiments are not limited to threaded connections.

At block 620, an upper connector portion is formed in the tubular body 302. The upper connector portion may be proximate the uphole end 303 of the tubular body 302. The upper connector portion may be configured to engage a barrel, a plunger, or any other suitable component of a downhole pump that may be positioned uphole of the tubular body 302.

In some embodiments, the upper connector portion is formed in the inner wall 304 or the outer wall 306 of the tubular body 302. The upper connector portion may be formed by machining or any other suitable method. In some embodiments, the upper connector portion comprises a threaded section that threadingly engages a complementary threaded section in the barrel, plunger, bushing, or other component. In other embodiments, the upper connector portion comprises any other suitable structure to facilitate connection to another downhole component of a downhole pump and embodiments are not limited to threaded connections.

In FIG. 6B, block 618 is shown before block 620; however, in other embodiments, the steps of block 620 can be performed before the steps of block 618 or at substantially the same time. In alternative embodiments, the upper connector portion may be formed before the plug portion 412 is removed at block 616. In other embodiments, the tubular body 302 may be provided at block 604 with the upper connector portion already formed therein.

Therefore, by removing the plug portion 412 from the axial bore 308 and forming upper and lower connector portions in the tubular body 302, the tubular body 302 can be adapted for use as part of a standing valve assembly (e.g. where the upper connector portion is configured to connect with a barrel and the lower connector portion is configured to connect with a seat bushing) or as part of a traveling valve assembly (e.g. where the upper connector portion is configured to connect to a plunger and the lower connector portion is configured to connect with a seat plug) as desired.

FIGS. 8A to 8C are cross-sectional views of an example flow cage assembly 800 assembled from the kit 100 using the method 600, shown at various stages of the steps of blocks 616-620 described above (the final flow cage assembly 800 is shown in FIG. 8C). In this embodiment, the flow cage assembly 800 is configured for use in a traveling valve assembly of a downhole pump.

As shown in FIG. 8A, the plug portion 412 of the retaining element 402 has been removed and only the annular portion 410 remains (the plug portion 412 is therefore not visible in FIGS. 8A-8C). The remaining annular portion 410 secures the insert 202 in the axial bore 308 of the tubular body 302.

As shown in FIG. 8B, a lower connector portion 804 may be formed in the tubular body 302 proximate the downhole end 305. The lower connector portion 804 in this embodiment is configured to engage a seat plug (such as the seat plug 1108 shown in FIG. 11, discussed below). In some embodiments, forming the lower connector portion 804 comprises forming a threaded section in the inner wall 304 of the tubular body 302 at the location indicated by dashed lines 805. It will be understood that although dashed lines 805 are shown on either side of the inner wall 304, the threaded section will extend around the full circumference of the inner wall 304.

As shown in FIG. 8C, an upper connector portion 802 may be formed in the tubular body 302 proximate the uphole end 303. In this embodiment, the upper connector portion 802 is configured to engage a downhole end of a plunger (such as the plunger 1106 shown in FIG. 11, discussed below). In some embodiments, forming the upper connector portion 802 comprises machining the inner wall 304 to widen the first upper section 312 of the axial bore 308 to produce a first widened section 812. In some embodiments, the inner wall 304 at the second upper section 313 of the axial bore 308 may also be machined to produce a second widened section 813.

In this embodiment, forming the upper connector portion 802 further comprises forming a threaded section in the inner wall 304 of the tubular body 302 at the location indicated by dashed lines 803. The threaded section may be disposed around the circumference of the first widened section 812 of the axial bore 308. It will be understood that although dashed lines 803 are shown on either side of the inner wall 304, the threaded section will extend around the full circumference of the inner wall 304. When the upper and lower connector portions 802 and 804 have been formed in the tubular body 302, the flow cage assembly 800 is ready for use in a traveling valve assembly.

Figure 9A:
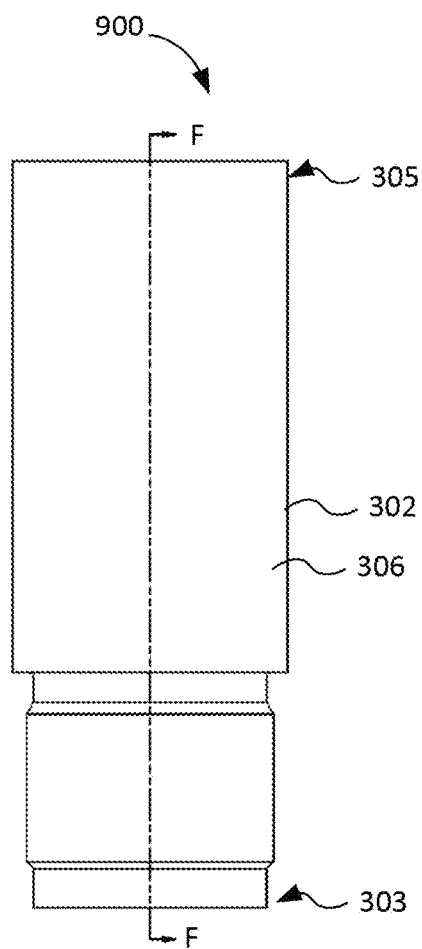
FIG. 9A is a side view of another example flow cage assembly produced from the assembled kit of FIGS. 7A-7B, according to some embodiments.
Figure 9B:
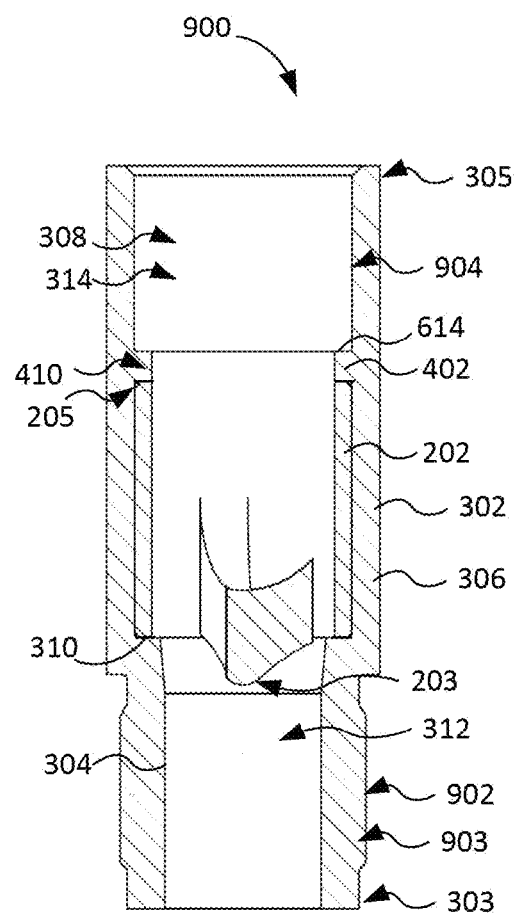
FIG. 9B is a cross-sectional view of the flow cage assembly taken along line F-F of FIG. 9A.

FIGS. 9A and 9B show another example flow cage assembly 900 assembled from the kit 100 using the method 600. The flow cage assembly 900 is configured for use in a standing valve assembly of a downhole pump.

As shown in FIG. 9B, the plug portion 412 of the retaining element 402 has been removed such that only the annular portion 410 remains (the plug portion 412 is therefore not visible in FIG. 9B). The annular portion 410 secures the insert 202 in the axial bore 308 of the tubular body 302.

A lower connector portion 904 has been formed in the tubular body 302 proximate the downhole end 305. In this embodiment, the lower connector portion 904 has been formed in the inner wall 304 of the tubular body 302 and is configured to engage a seat bushing (such as the seat bushing 1208 shown in FIG. 12, discussed below). In some embodiments, the lower connector portion 904 comprises a threaded section (such as threaded section 908 visible in FIG. 12).

An upper connector portion 902 has been formed in the tubular body 302 proximate the uphole end 303. In this embodiment, the upper connector portion 902 has been formed in the outer wall 306 of the tubular body 302 and is configured to engage a downhole end of a barrel (such as barrel 1206 of FIG. 12). In this embodiment, the outer wall 306 of the tubular body 302 has been machined proximate the uphole end 303 to produce a narrowed portion 903. The narrowed portion 903 may be configured to be received into the downhole end of the barrel. In some embodiments, the narrowed portion 903 comprises a threaded section (such as threaded section 906 visible in FIG. 12).

Therefore, in some embodiments, the same kit 100 can be used to assemble a flow cage assembly for either a standing valve or a traveling valve, depending on the upper and lower connector portions formed in the tubular body. In other embodiments, the kit may comprise a tubular body, insert, and retaining element of a particular size suitable for a specific standing valve or traveling valve.

Figure 10:
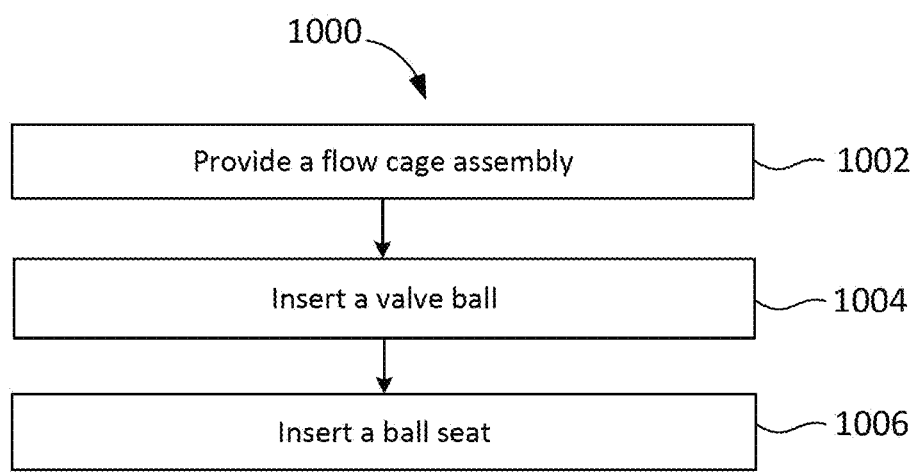
FIG. 10 is a flowchart of an example method for assembling a valve assembly, according to some embodiments.

FIG. 10 is a flowchart of an example method 1000 for assembling a valve assembly, according to some embodiments. The method 1000 may be used to assemble a traveling valve assembly or a standing valve assembly.

At block 1002, a flow cage assembly is provided. In this example, the flow cage assembly is the flow cage assembly 800 or 900 as described above. The flow cage assembly 800/900 may comprise a tubular body 302 and an insert 202 secured with a retaining element 402.

At block 1004, a valve ball is inserted into the flow cage assembly 800/900. The valve ball may be inserted through the opening 408 of the retaining element 402 into the axial flow passage 216 of the insert 202.

At block 1006, a ball seat is inserted into the flow cage assembly 800/900. The ball seat may be inserted into the axial bore 308 of the tubular body 302, below the valve ball, such that the ball seat abuts the retaining element 402. The ball seat thereby forms a lower boundary for the valve ball, while the ball stop 214 of the insert 202 forms an upper boundary. The ball seat may be approximately ring-shaped with a central hole or opening therethrough. In some embodiments, the ball seat is made of the same material as the insert 202. In other embodiments, the ball seat is made of any other suitable material.

In some embodiments, the method 1000 further comprises connecting the flow cage assembly 800/900 to an uphole component and a downhole component. The flow cage assembly 800/900 may be connected to an uphole component via the upper connector portion 802/902 and connected to a downhole component via the lower connector portion 804/904. In some embodiments, where the valve assembly is a traveling valve assembly, the uphole component comprises a plunger and the downhole component comprises a seat plug. In other embodiments, where the valve assembly is a standing valve assembly, the uphole component comprises a barrel and the downhole component comprises a seat bushing. In other embodiments, the uphole and downhole components are any other suitable components.

Figure 11:
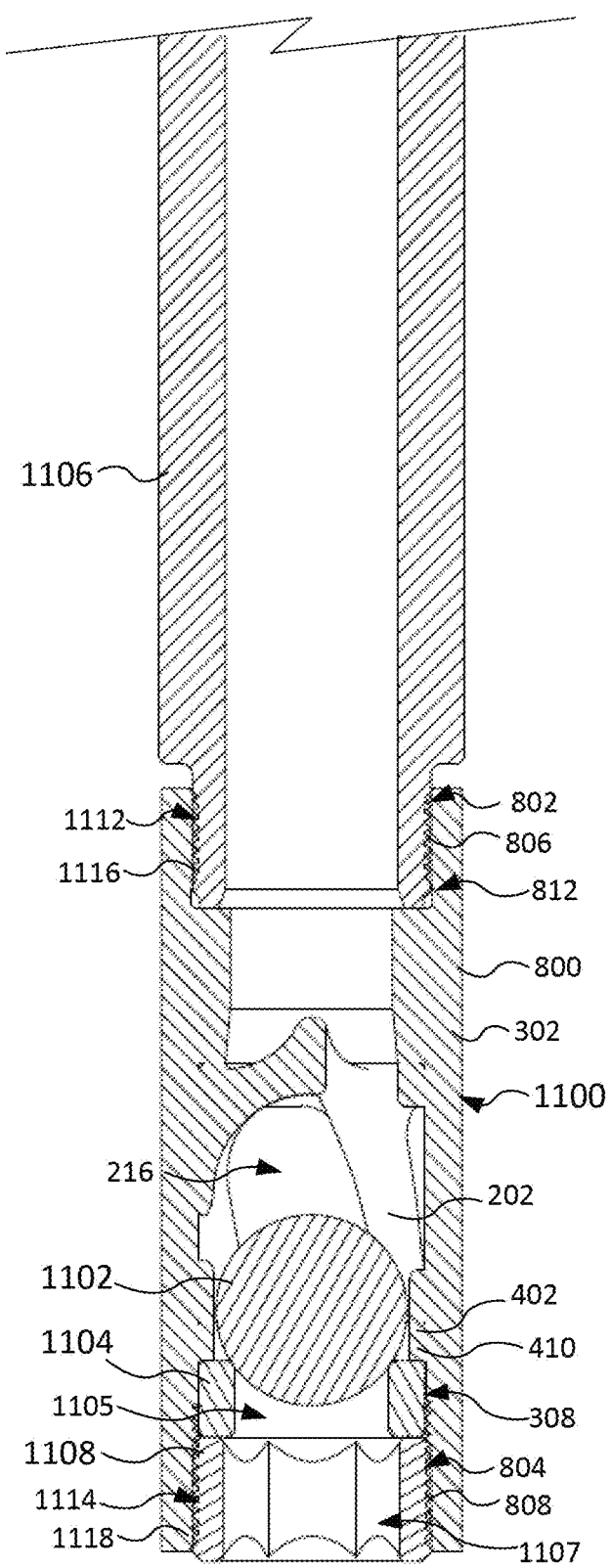
FIG. 11 is a side, partial cross-sectional view of an example traveling valve assembly including the flow cage assembly of FIG. 8A-8C, shown assembled with a plunger and a seat plug.

FIG. 11 is a cross-sectional view of an example traveling valve assembly 1100 including the flow cage assembly 800 of FIG. 8C, assembled using the method 1000 of FIG. 10. The traveling valve assembly 1100 is shown assembled with a plunger 1106 (note that only a portion of the plunger 1106 is shown in FIG. 11) and a seat plug 1108.

The traveling valve assembly 1100 comprises the flow cage assembly 800, a valve ball 1102, and a ball seat 1104. The valve ball 1102 is received in the axial flow passage 216 of the insert 202 and the ball seat 1104 is received in the axial bore 308 of the tubular body 302. The ball seat 1104 in this embodiment is ring-shaped with a central opening 1105 therethrough. The ball seat 1104 abuts the annular portion 410 of the retaining element 402.

The seat plug 1108 in this embodiment is generally tubular in shape with an axial channel 1107 therethrough. The seat plug 1108 is partially received into axial bore 308 of the tubular body 302 and abuts the ball seat 1104. The seat plug 1108 comprises an upper connector portion 1114 that engages the lower connector portion 804 of the tubular body 302. In this embodiment, the lower connector portion 804 of the tubular body 302 comprises an inner threaded section 808 and the upper connector portion 1114 of the seat plug 1108 comprises a complementary outer threaded section 1118 such that the tubular body 302 threadingly engages the seat plug 1108. The seat plug 1108 thereby secures the ball seat 1104 in the axial bore 308 against the retaining element 402.

The plunger 1106 comprises a lower connector portion 1112 that is received into the first widened section 812 of the axial bore 308. In this embodiment, the upper connector portion 802 of the tubular body 302 comprises an inner threaded section 806 and the lower connector portion 1112 of the plunger 1106 comprises an outer threaded section 1116 such that the tubular body 302 threadingly engages the plunger 1106.

In use, on the upstroke, the valve ball 1102 is seated on the ball seat 1104 such that the traveling valve 1100 is closed and the valve ball 1102 blocks fluid flow in the downhole direction. On the downstroke, the valve ball 1102 is raised from the ball seat 1104 such that the traveling valve 1100 is open, allowing upward flow of fluid through the axial flow passage of the insert 202 (via the axial channel 1107 of the seat plug 1108 and the central opening 1105 of the ball seat 1104) and into the plunger 1106.

Figure 12:
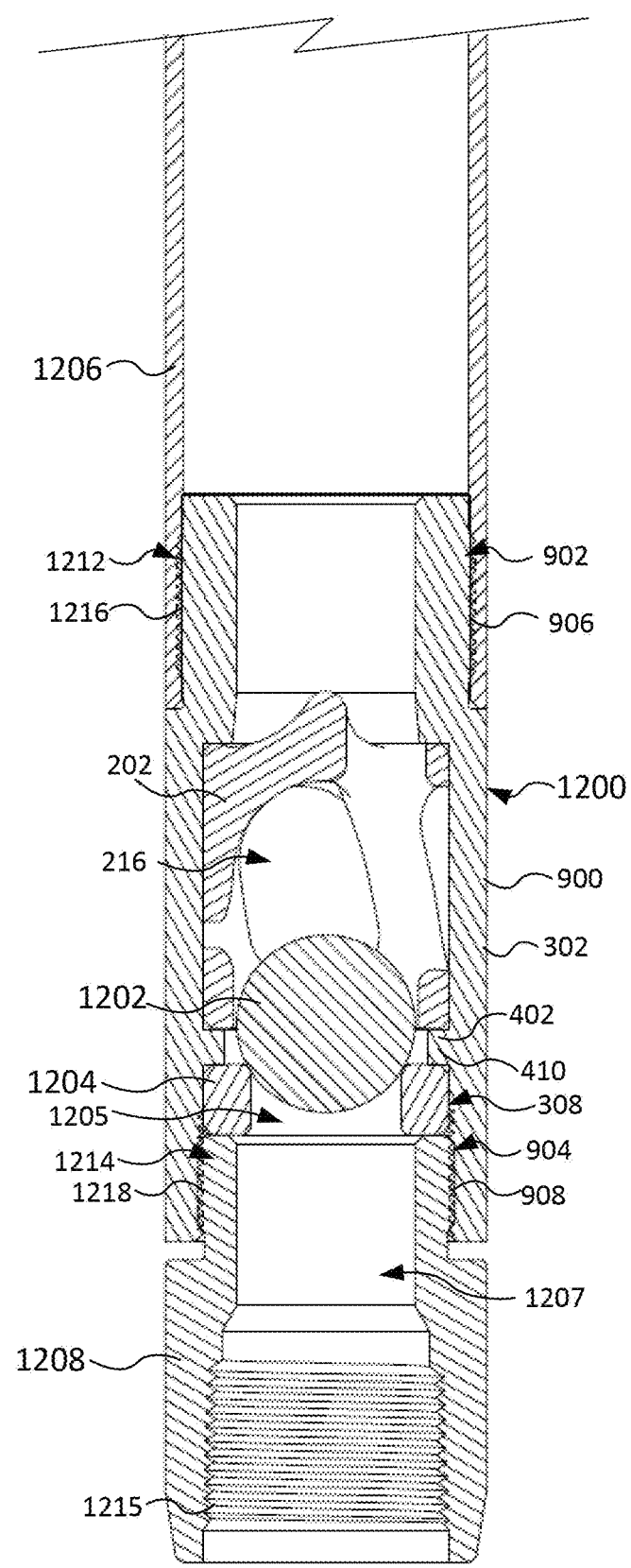
FIG. 12 is a side, partial cross-sectional view of an example standing valve assembly including the flow cage assembly of FIGS. 9A-9C, shown assembled with a barrel and a seat bushing.

FIG. 12 is a cross-sectional view of an example standing valve assembly 1200 including the flow cage assembly 900 of FIGS. 9A and 9B, assembled using the method 1000 of FIG. 10. The standing valve assembly 1200 is shown assembled with a barrel 1206 (only a portion of the barrel 1206 is shown in FIG. 12) and a seat bushing 1208.

The standing valve assembly 1200 comprises the flow cage assembly 900, a valve ball 1202, and a ball seat 1204. The valve ball 1202 is received in the axial flow passage 216 of the insert 202 and the ball seat 1204 is received in the axial bore 308 of the tubular body 302. The ball seat 1204 in this embodiment is ring-shaped with a central opening 1205 therethrough. The ball seat 1204 abuts the annular portion 410 of the retaining element 402.

The seat bushing 1208 in this embodiment is generally tubular in shape with an axial channel 1207 therethrough. The seat bushing 1208 comprises an upper connector portion 1214 that is received into the axial bore 308 of the tubular body 302 and abuts the ball seat 1204. The upper connector portion 1214 engages the lower connector portion 904 of the tubular body 302. In this embodiment, the lower connector portion 904 of the tubular body 302 comprises an inner threaded section 908 and the upper connector portion 1214 of the seat bushing 1208 comprises a complementary outer threaded section 1218 such that the tubular body 302 is threadingly engaged with the seat bushing 1208. The seat bushing 1208 thereby secures the ball seat 1204 in the axial bore 308 against retaining element 402.

The seat bushing 1208 in this embodiment further comprises a lower connector portion 1215. The lower connector portion 1215 may be configured to engage a suitable downhole component including, for example, a strainer.

The barrel 1206 comprises a lower connector portion 1212 that receives the upper connector portion 902 of the tubular body 302 therein. In this embodiment, the upper connector portion 902 of the tubular body 302 comprises an outer threaded section 906 and the lower connector portion 1212 of the barrel 1206 comprises an inner threaded section 1216 such that the tubular body 302 threadingly engages the barrel 1206.

In use, on the upstroke, the valve ball 1202 is raised from the ball seat 1204 such that the standing valve 1200 is open, allowing upward flow of fluid through the axial flow passage 216 of the insert 202 (via the axial channel 1207 of the seat bushing 1208 and the central opening 1205 of the ball seat 1204) and into the barrel 1206. On the downstroke, the valve ball 1202 is seated on the ball seat 1204 such that the standing valve is closed and the valve ball 1202 blocks fluid flow in the downhole direction.

Another example kit 1300 for assembling a flow cage assembly will be described with reference to FIGS. 13A to 14B (the complete kit is visible in FIG. 13B). The kit 1300 may be used to assemble a flow cage assembly for a top plunger adapter, according to some embodiments. As used herein, "top plunger adapter" refers to an element that interconnects a plunger and a sucker rod or a valve rod, either directly or indirectly.

Referring to FIG. 13B, the kit 1300 comprises a body or shell 1302, a tubular insert 1304, and a retaining element 1306.

The body 1302 extends along a longitudinal axis 1301 and has an uphole end 1303 and a downhole end 1305. The body 1302 has an inner wall 1308 and an outer wall 1310. The inner wall 1308 defines an axial chamber 1312 extending from the downhole end 1305 upwards into the body 1302. The tubular insert 1304 and the retaining element 1306 are received into the axial chamber 1312, as discussed in more detail below.

The body 1302 may further comprise a plurality of side ports 1314 extending from the outer wall 1310 to the inner wall 1308, thereby allowing for fluid communication between the axial chamber 1312 and the exterior of the body 1302. In this embodiment, the body 1302 comprises three side ports 1314, spaced circumferentially around the body 1302. In other embodiments, the body 1302 may comprise additional side ports 1314 and embodiments are not limited to only three side ports 1314.

Each port 1314 is in the form of a slot with an elongated, oblong profile. In this embodiment, each port 1314 is elongated along an approximately longitudinal path. In other words, each port 1314 is elongated in a direction (indicated by arrow 1315 in FIG. 13A) that is approximately parallel to the longitudinal axis 1301 of the body 1302. In other embodiments, the ports 1314 may each be elongated along a generally helical path (i.e. such that the direction indicated by arrow 1315 is angled with respect to the longitudinal axis 1301).

The specific profile of each port 1314 may be approximately elliptical or oval in shape. Each port 1314 may be cut or drilled into the body 1302 from the outer wall 1310 to the inner wall 1308. In this embodiment, the ports 1314 are cut or drilled downward from the outer wall 1310 to the inner wall 1308 at an angle with respect to the longitudinal axis 1301. In some embodiments, the angle is approximately 18 degrees with respect to the longitudinal axis 1301 (i.e. approximately 18 degrees from vertical). In other embodiments, the ports 1314 are at any other suitable angle. Each port 1314 therefore has outer opening 1317 (visible in FIG. 13A) and an inner opening 1319 (visible in FIG. 13B), the inner opening 1319 being lower than the outer opening 1317 and connecting to the axial chamber 1312.

In other embodiments, the body 1302 may comprise any other suitable number, shape, or configuration of ports.

Figure 14A:
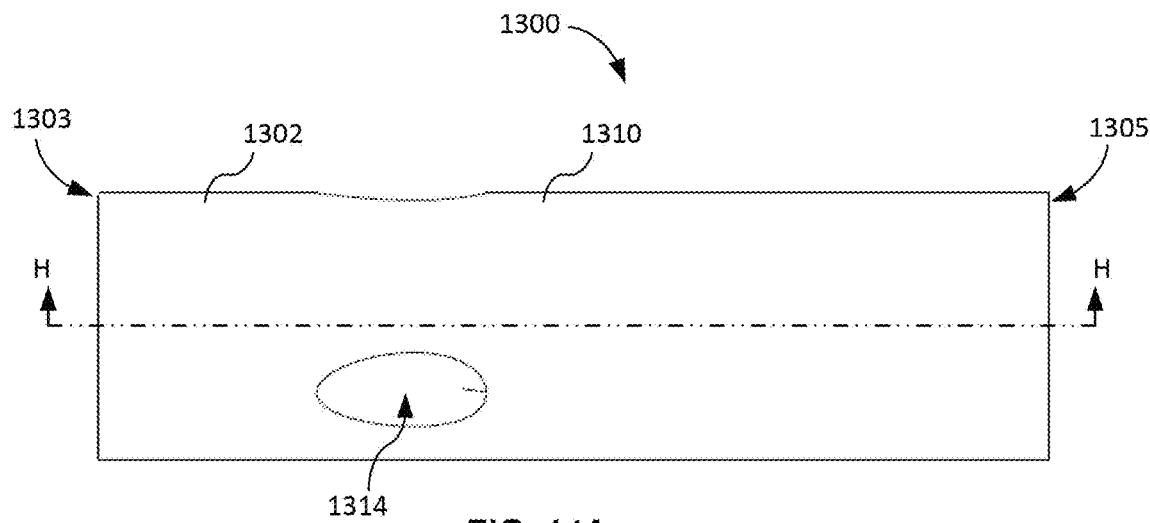
FIG. 14A is a side view of a body of the kit of FIGS. 13A-13B.
Figure 14B:
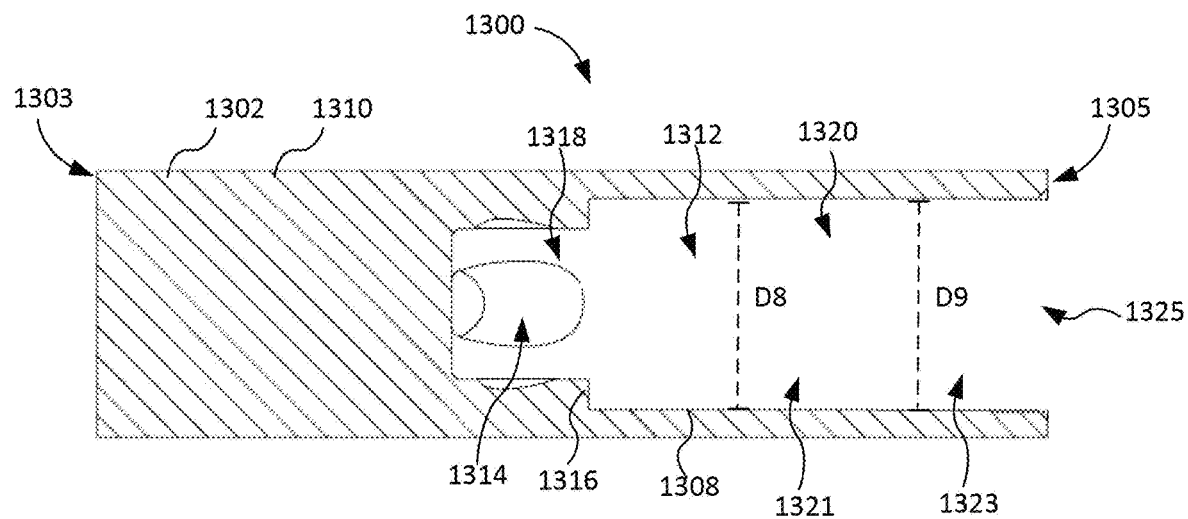
FIG. 14B is a cross-sectional view of the body, taken along line H-H in FIG. 14A.

Referring to FIG. 14B, the inner wall 1308 of the body 1302 defines an annular shoulder 1316 that divides the axial chamber 1312 into an upper chamber portion 1318 and a lower chamber portion 1320. The side ports 1314 extend between the upper chamber portion 1318 and the exterior of the body 1302. The lower chamber portion 1320 is configured to receive the tubular insert 1304 and the retaining element 1306 therein (not visible in FIG. 14B).

The lower chamber portion 1320 in this embodiment comprises a first lower section 1321 and a second lower section 1323. The first lower section 1321 has an inner diameter D8 and the second lower section 1323 has an inner diameter D9. The diameter D8 is a suitable diameter to allow the tubular insert 1304 to be received into the first lower section 1321. In some embodiments, diameter D8 is approximately the same as, or slightly greater, than the outer diameter of the tubular insert 1304 (e.g. see D1 of the insert 202 of FIGS. 2A-2B). The insert 1304 may thereby fit snugly into the first lower section 1321.

The diameter D9 of the second lower section 1323 may be slightly greater than the diameter D8. In some embodiments, the diameter D9 is approximately the same as the outer diameter of the retaining element 1306 (e.g. see D6 of the retaining element 402 of FIGS. 4A-4C). In other embodiments, the diameters D8 and D9 may be approximately the same such that the lower chamber portion 1320 has an approximately equal inner diameter throughout.

As discussed in more detail below, the diameter D8/D9 of the lower chamber portion 1320 may be expandable to a second, larger diameter (not shown) when the body 1302 is heated.

Referring again to FIG. 13B, the tubular insert 1304 is similar in structure to the tubular insert 202, as described above. The insert 1304 comprises a body 1322 with a plurality of circumferentially spaced ribs 1324 that define a plurality of side openings 1326. In this embodiment, the insert 1304 comprises three ribs 1324 and three side openings 1326. The ribs 1324 may be angled such that each of the side openings 1326 extends along a substantially helical path. In other embodiments, the ribs 1324 may be relatively straight and thereby define substantially vertical side openings.

The insert 1304 may define an axial flow passage 1325 therethrough. In some embodiments, the axial flow passage 1325 is dimensioned to receive a valve ball (not shown) therein. The insert 1304 may further comprise a central ball stop 1328 with outlet openings 1329 therearound.

The retaining element 1306 is similar in structure to the retaining element 402 of the kit 100, as described above. The retaining element 1306 comprises an annular portion 1330 and a plug portion 1332. The annular portion 1330 defines an opening 1336. In this embodiment, the annular portion 1330 is integral with the plug portion 1332. In other embodiments, the annular portion 1330 and the plug portion 1332 may be separate components.

The retaining element 1306 may have an outer diameter slightly greater than the diameter D8 of first lower section 1321 of the axial chamber 1312 and approximately equal to the diameter D9 of the second lower section 1323. The outer diameter of the retaining element 1306 is also slightly less than the expanded diameter of the axial chamber 1312 when the body 1302 is heated, as discussed in more detail below.

The difference between the diameter D8 and the outer diameter of the retaining element 1306 allows the retaining element 1306 to form an interference fit with the body 1302. In some embodiments, the interference is between about 0.001 to about 0.0025 inches per inch of diameter. The allowance per inch may decrease as the diameter D9 of the lower chamber portion 1320 increases. For a top plunger adapter, the interference may be between 0.001 and about 0.013 inches. However, a person skilled in the art would understand that the design interference may be lower or higher than this range if needed.

As shown in FIGS. 13A and 13B, in this embodiment, the aligned insert 1304 and retaining element 1306 are axially (longitudinally) longer than the axial chamber 1312. The retaining element 1306 therefore extends longitudinally beyond the downhole end 1305 of the body 1302 when the insert 1304 and the retaining element 1306 are received into the axial chamber 1312.

The body 1302 and the retaining element 1306 may each be comprised of a material with relatively high tensile strength including, but not limited to, alloy steel, monel, or stainless steel. The body 1302 may be made of the same material as the retaining element 1306 or a different material. The insert 1304 may be comprised of a relatively hard and durable material including, but not limited to, cobalt.

Figure 15A:
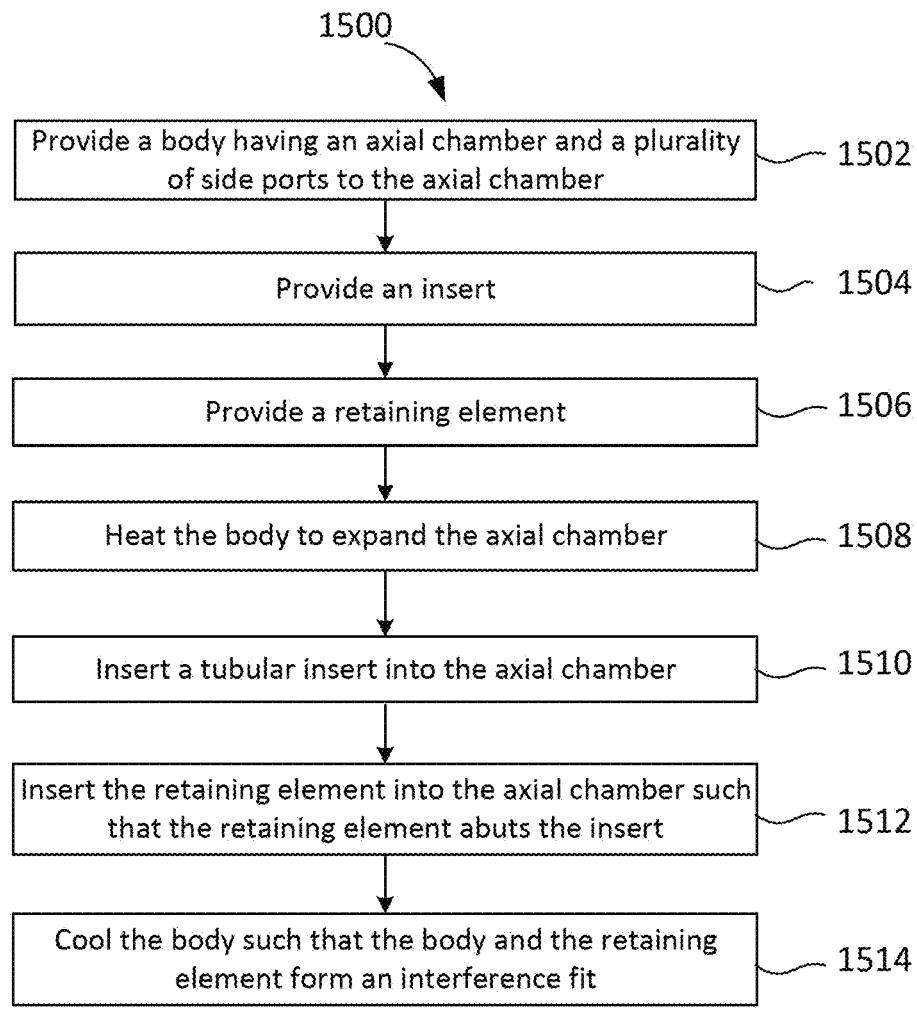
FIG. 15A is a flowchart of an example method for assembling a flow cage assembly for a top plunger adapter using the kit of FIGS. 13A-13B, according to some embodiments.

FIG. 15A is a flowchart of an example method 1500 for assembling a flow cage assembly for a top plunger adapter, according to some embodiments. The method 1500 will be described as implemented using the kit 1300; however, the method 1500 may alternatively be implemented using any other suitable kit in other embodiments. FIGS. 13A and 13B show the kit 1300 assembled by the method 1500 of FIG. 15A.

At block 1502, a body or shell 1302 is provided. The body comprises an axial chamber 1312 and a plurality of side ports 1314 to the axial chamber 1312. The axial chamber 1312 has a first diameter (e.g. diameter D8 of FIG. 14B), expandable to a second diameter (not shown) when the body 1302 is heated, as described in more detail below.

At block 1504, an insert 1304 is provided, the insert 1304 receivable into the axial chamber 1312 of the body 1302. The insert 1304 comprises an axial flow passage 1325 therethrough.

At block 1506, a retaining element 1306 is provided, the retaining element 1306 having an outer diameter that is between the first diameter and the second diameters of the axial chamber 1312. In this embodiment, the retaining element 1306 and the body 1302 are made of the same material e.g. alloy steel, monel, or stainless steel.

At block 1508, the body 1302 is heated to expand the axial chamber 1312 to its second diameter. In some embodiments, the body 1302 is heated to expand the axial chamber 1312 such that the second diameter is at least about 0.001 to about 0.0025 inches (per inch of diameter) greater than the first diameter D8. For example, the second diameter may be about 0.001 to 0.013 inches greater than the first diameter D8. In other embodiments, the body 1302 may be heated to expand the axial chamber 1312 any suitable amount. It will be understood that, in this embodiment, the diameter D9 also expands to a similar extent.

The steps at block 1508 may otherwise be similar to the steps of block 608 of the method 600, as described above.

At block 1510, the tubular insert 1304 is then inserted into the axial chamber 1312 of the body 1302. In some embodiments, the tubular insert 1304 is at room temperature prior to insertion into the body 1302. In some embodiments, the body 1302 is positioned with its uphole end 1303 facing downwards and the insert 1304 is inserted into the body 1302 with its own uphole end (i.e. the ball stop 1328) facing downwards. In other words, the body 1302 and the insert 1304 are opposite to how they would be positioned in a downhole pump system. The insert 1304 may be inserted to abut the annular shoulder 1316 of the body 1302 such that the ball stop 1328 extends into the upper chamber portion 1318.

The insert 1304 may be inserted into the axial chamber 1312 such that the ribs 1324 are rotationally offset (i.e. not aligned) from the side ports 1314 of the body 1302 (see FIG. 16C of the final flow cage assembly, for example). In other words, each rib 1324 is rotationally offset from a respective side port 1314. By offsetting the ribs 1324 from the side ports 1314, in the assembled flow cage assembly, fluid will be able to flow uphole through the outlet openings 1329 of the insert 1304 and out of the body 1302 via the side ports 1314.

At block 1512, the retaining element 1306 is inserted into the axial chamber 1312 of the body 1302. In some embodiments, the retaining element 1306 is at room temperature prior to insertion. In other embodiments, the retaining element 1306 is cooled prior to insertion in a similar manner as described above at block 612 of the method 600.

The retaining element 1306 may be inserted into the axial chamber 1312 with the annular portion 1330 facing downwards, such that the annular portion 1330 abuts the tubular insert 1304. The opening 1336 may therefore be approximately axially aligned with the axial flow passage 1325 of the insert 1304. In embodiments in which the annular portion 1330 is separate from the plug portion 1332, inserting the retaining element 1306 comprises inserting the annular portion 1330 and inserting the plug portion 1332 such that the plug portion 1332 abuts the annular portion 1330.

In this embodiment, the combination of the insert 1304 and the retaining element 1306 are longitudinally longer than the axial chamber 1312, such that the plug portion 1332 of the retaining element 1306 extends longitudinally past the downhole end 1305 of the body 1302. The plug portion 1332 may thereby be used to manipulate the retaining element 1306 to position the retaining element 1306 in the axial chamber 1312, similar to the plug portion 412 of the retaining element 402, as described above. The weight of the plug portion 1332 may also help to maintain the positioning of the retaining element 1306 and the insert 1304 within the axial chamber 1312, including to maintain the offset between the ribs 1324 of the insert 1304 and the side ports 1314 of the body 1302.

At block 1514, the body 1302 is cooled such that the retaining element 1306 forms an interference fit with the body 1302. The steps at block 1514 may be similar to the steps at block 614 of the method 600 as described above. The retaining element 1306 therefore securely retains the insert 1304 in the axial chamber 1312 of the body 1302.

The annular portion 1330 of the retaining element 1306 forms an interference fit with the body 1302 due to the different between the outer diameter of the retaining element and the inner diameter D8 of the first lower section 1321 of the axial chamber 1312. The plug portion 1332 does not form an interference fit with the body 1302 due to the slightly greater diameter D9 of the second lower section 1323. Thus, the plug portion 1332 can be more easily removed, as described above with respect to the plug portion 412 of the retaining element 402. In alternative embodiments, in which the diameter D9 is the same as the diameter D8, the entire retaining element 1306 may form an interference fit with the body 1302.

Figure 15B:
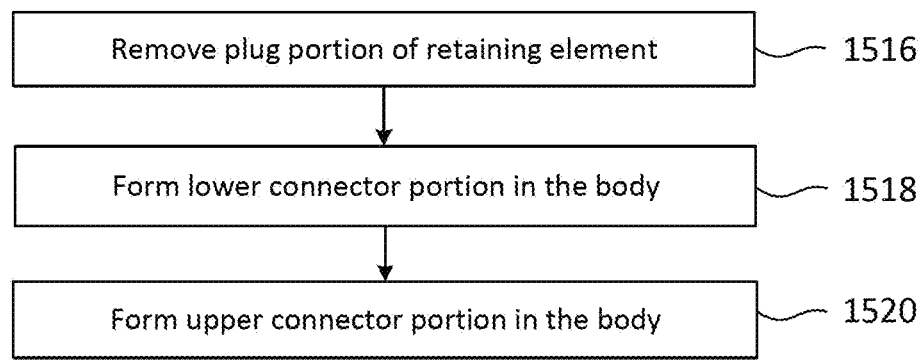
FIG. 15B is a flowchart showing additional steps to the method of FIG. 15A.

FIG. 15B is a flowchart showing additional steps to the method 1500 of FIG. 15A, according to some embodiments. The steps of FIG. 15B will be discussed with reference to FIGS. 16A to 16C, which show a flow cage assembly 1600 assembled by the steps of FIGS. 15A and 15B from the kit 1300.

At block 1516, the plug portion 1332 of the retaining element 1306 is removed. With the plug portion 1332 removed, only the annular portion 1330 remains and the opening 1336 extends fully through the annular portion 1330. The steps at block 1516 may be similar to the steps at block 616 of the method 600 as described above. FIG. 16B shows the annular portion 1330 retained in the axial chamber 1312.

At block 1518, a lower connector portion is formed in the body 1302, proximate the downhole end 1305. As shown in FIG. 16B, in this embodiment, the lower connector portion 1604 is formed in the inner wall 1308 of the body 1302. The lower connector portion 1604 may be formed by machining or any other suitable method.

The lower connector portion 1604 may be configured to engage an uphole end of a plunger (such as the plunger 1706 of FIG. 17, discussed below). In this embodiment, the inner wall 1308 of the body 1302 has been machined to produce a wider section 1605 that may receive the uphole end of the plunger therein. In some embodiments, the wider section 1605 comprises an inner thread (not shown) that threadingly engages complementary outer threads in the uphole end of the plunger. In other embodiments, the lower connector portion 1604 comprises any other suitable structure to engage a plunger and embodiments are not limited to threaded connections.

At block 1520, an upper connector portion is formed in the body 1302. As shown in FIGS. 16A and 16B, the upper connector portion 1602 in this embodiment is formed in the outer wall 1310 of the body 1302. The upper connector portion 1602 is formed at the uphole end 1303 of the body 1302, above the side ports 1314. The upper connector portion 1602 may be formed by machining or any other suitable method.

The upper connector portion 1602 may be configured to engage a downhole end of a sucker rod or valve rod (not shown). In this embodiment, the outer wall 1310 of the body 1302 has been machined proximate the uphole end 1303 to produce a narrowed portion 1603. The narrowed portion 1603 may be configured to be received into the downhole end of the sucker rod/valve rod. In some embodiments, the narrowed portion 1603 comprises a threaded section (not shown) to threadingly engage a complementary threaded section in the sucker rod/valve rod.

In this embodiment, the upper connector portion 1602 is configured to connect directly to a sucker rod/valve rod and the lower connector portion 1604 is configured to connect directly to a plunger. However, in other embodiments, the upper connector portion 1602 and/or the lower connector portion 1604 may instead be configured to connect to a bushing, adapter, or connector that in turn connects to the sucker rod/valve rod and plunger, respectively.

In FIG. 15B, block 1518 is shown before block 1520; however, in other embodiments, the steps at block 1520 can be performed before the steps of block 1518 or substantially at the same time. In other embodiments, the upper connector portion 1602 may be formed before the plug portion 1332 is removed at block 1516. In other embodiments, the body 1302 may be provided at block 1502 with the upper connector portion 1602 already formed therein.

FIGS. 16A-16C show the flow cage assembly 1600 assembled by the method 1500 of FIGS. 15A-15B. In some embodiments, the flow cage assembly 1600 itself may be used as a top plunger adapter for a downhole reciprocating pump having a traveling valve and a standing valve (not shown).

In operation, on the downstroke, fluid will flow uphole through the traveling valve and the plunger and into the flow cage assembly 1600. The fluid passes through the axial flow passage 1325 of the insert 1304, out of the outlet openings 1329, and through the side ports 1314 of the body 1302. The inclusion of the insert 1304 may help to condition the fluid flow passing therethrough. The insert 1304 may help to guide the fluid flow through the center of the axial flow passage 1325 (i.e. close to the longitudinal axis 1301), rather than along the sides (i.e. close to the inner surface of the insert 1304). By directing the flow of fluid away from the sides of the axial flow passage, the insert 1304 may thereby also have a protective function to reduce wear and damage to the flow cage assembly 1600.

Figure 17:
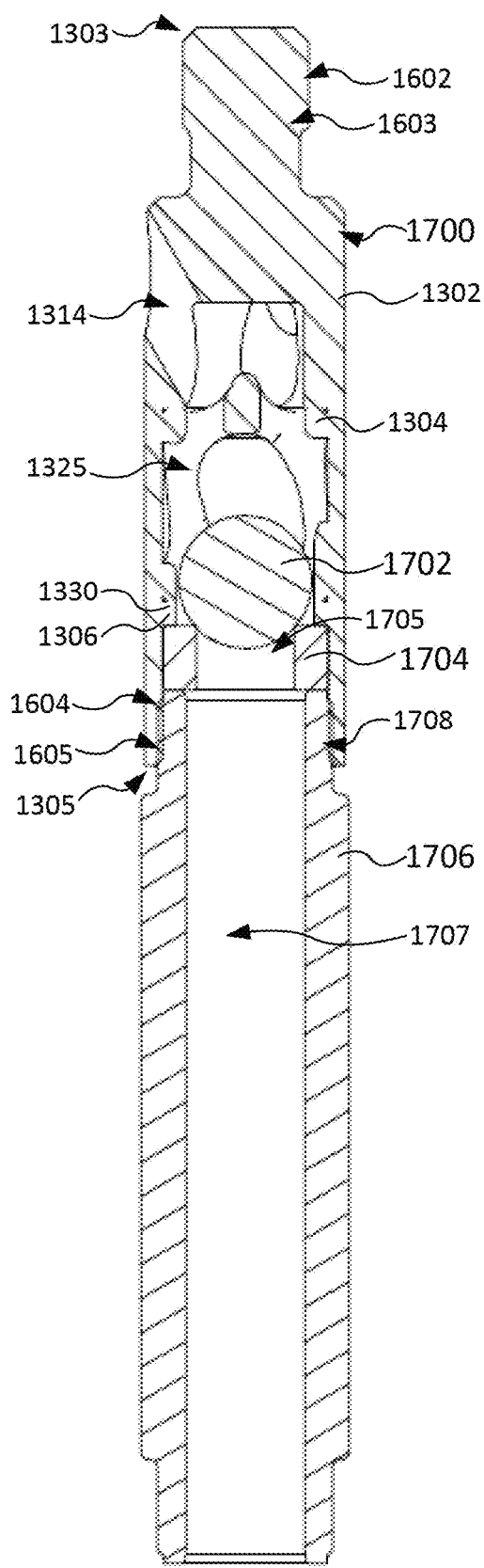
FIG. 17 is a cross-sectional view of a top plunger adapter including the flow cage assembly of FIGS. 16A-16C.

FIG. 17 is a cross-sectional view of another top plunger adapter 1700, according to some embodiments, shown assembled with a plunger 1706. The top plunger adapter 1700 and the plunger 1706 may be deployed in a downhole reciprocating pump also comprising a traveling valve and a standing valve.

The top plunger adapter 1700 in this embodiment comprises the flow cage assembly 1600 of FIGS. 16A-16C, a valve ball 1702, and a ball seat 1704. The top plunger adapter 1700 may be assembled in a similar manner to the method 1000 of FIG. 10, as described above. In some embodiments, the ball 1702 and the ball seat 1704 may be provided as part of the kit 1300.

The valve ball 1702 is received within the insert 1304 and the ball seat 1704 is received in the body 1302, below the insert 1304. In this embodiment, the ball 1702 is approximately spherical; however, in other embodiments, the ball 1702 may be replaced with a sealing member of any other suitable shape. The ball seat 1704 may be ring-shaped with a central opening 1705 therethrough. The ball seat 1704 abuts the annular portion 1330 of the retaining element 1306.

The top plunger adapter 1700 is connected to the plunger 1706 at the downhole end 1305 of the body 1302. The plunger 1706 may secure the ball seat 1704 within the body 1302 against the annular portion 1330 of the retaining element 1306.

The plunger 1706 is generally tubular in shape and comprises an axial channel 1707 therethrough. The plunger 1706 has an upper connector portion 1708 that engages the lower connector portion 1604 of the flow cage assembly 1600. In this embodiment, the upper connector portion 1708 of the plunger 1706 is received within the wider section 1605 of the body 1302. The upper connector portion 1708 may comprise a threaded section (not shown) that engages a complementary threaded section of the lower connector portion 1604. In other embodiments, the upper connector portion 1708 can engage the lower connector portion 1604 by any other suitable means.

The top plunger adapter 1700 may also be connected to a sucker rod or valve rod (not shown) at the uphole end 1303 of the body 1302 via the upper connector portion 1602.

In use, the ball 1702 is seated on the ball seat 1704 on the downstroke and is displaced (i.e. raised off of) the ball seat 1704 on the upstroke. Therefore, on the downstroke, fluid traveling uphole through the traveling valve and the plunger 1706 is arrested at the top plunger adapter 1700. On the upstroke, the fluid flow is released to continue to flow uphole through the top plunger adapter 1700. The top plunger adapter 1700 may thereby function as a supplementary check valve on the top of the pump. The adapter 1700 may reduce the load of the hydrostatic column on the traveling valve, allowing the traveling valve to open more readily, thereby increasing pump efficiency and pump fillage. The adapter 1700 may also reduce the risk of gas lock, which would otherwise prevent the traveling valve and standing valve from functioning.

The top plunger adapter 1700 (or the flow cage assembly 1600 alone acting as a top plunger adapter) may be deployed in a reciprocating pump in combination with any embodiment of the traveling valve assemblies and/or standing valve assemblies described above. In other embodiments, the top plunger adapter may be combined with any other suitable traveling valve and/or standing valve.

Thus, the methods and kits disclosed herein may be used to assemble insert-type flow cage assemblies for use in standing valves, traveling valves, and/or top plunger adapters in a downhole pump. Although specific insert structures are described herein, the methods and kits may be adapted for use with any suitable insert. In addition, the flow cage assemblies may be adapted for use with any suitable uphole and downhole components and embodiments are not limited to the specific upper and lower connections described herein.

It is to be understood that a combination of more than one of the approaches described above may be implemented. Embodiments are not limited to any particular one or more of the approaches, methods or apparatuses disclosed herein. One skilled in the art will appreciate that variations or alterations of the embodiments described herein may be made in various implementations without departing from the scope of the claims.

The invention claimed is:

1. A method for assembling a flow cage assembly for a top plunger adapter, the method comprising:
   providing a body having an axial chamber and a plurality of side ports extending through the body into the axial chamber, wherein the axial chamber has a first diameter and is expandable to a second diameter when the body is heated;
   providing a tubular insert, the tubular insert receivable into the axial chamber;
   providing a retaining element, the retaining element receivable into the axial chamber and having an outer diameter between the first and second diameters;
   heating the body such that the axial chamber expands to the second diameter;
   inserting the tubular insert into the axial chamber;
   inserting the retaining element into the axial chamber such that the retaining element abuts the tubular insert; and cooling the body such that the body and the retaining element form an interference fit.

2. The method of claim 1, wherein the tubular insert comprises a plurality of ribs defining a plurality of side openings, and wherein inserting the tubular insert into the axial chamber further comprises positioning the tubular insert such that each of the plurality of ribs is offset from a respective side port of the plurality of side ports.

3. The method of claim 1, wherein the body has an outer wall and an inner wall and wherein each side port of the plurality of side ports is angled downward from the outer wall to the inner wall.

4. The method of claim 1, wherein the retaining element comprises an annular portion and a plug portion.

5. The method of claim 4, wherein the plug portion is integral with the annular portion, the annular portion abutting the tubular insert.

6. The method of claim 4, wherein the plug portion is separate from the annular portion, and wherein inserting the retaining element into the axial chamber comprises inserting the annular portion and inserting the plug portion such that the plug portion abuts the annular portion.

7. The method of claim 4, further comprising using the plug portion to manipulate the positioning of the retaining element in the axial chamber.

8. The method of claim 4, further comprising removing the plug portion after the interference fit has been formed such that only the annular portion remains.

9. The method of claim 8, wherein removing the plug portion comprises machining the plug portion out of the axial chamber.

10. The method of claim 1, wherein the body is heated to a temperature of between about 500° F. and about 900° F. for about 3 minutes to about 10 minutes.

11. The method of claim 1, wherein the body has an uphole end and a downhole end, and wherein the uphole end faces downwards while the tubular insert and the retaining element are inserted and the interference fit is formed.

12. The method of claim 1, further comprising forming an upper connector portion and a lower connector portion in the body, the upper connector portion connectable to a sucker rod or a valve rod and the lower connector portion connectable to a plunger.

13. A top plunger adapter comprising:
a flow cage assembly comprising:
    a body having an axial chamber and a plurality of side ports extending through the body into the axial chamber;
    a tubular insert received within the axial chamber, the tubular insert defining an axial flow passage therethrough; and
    a retaining element received within the axial chamber below the tubular insert, the retaining element forming an interference fit with the body.

14. The top plunger adapter of claim 13, further comprising:
a valve ball received within the axial flow passage of the tubular insert; and
a ball seat received within the axial chamber of the body, below the retaining element.

15. The top plunger adapter of claim 13, wherein the tubular insert comprises a plurality of ribs defining a plurality of side openings, and wherein the tubular insert is positioned in the axial chamber such that each of the plurality of ribs is offset from a respective side port of the plurality of side ports.

16. The top plunger adapter of claim 13, wherein the body has an outer wall and an inner wall and wherein each side port of the plurality of side ports is angled downward from the outer wall to the inner wall.

17. A kit for assembling a top plunger adapter, comprising:
a body having an axial chamber and a plurality of side ports extending through the body into the axial chamber, wherein the axial chamber has a first diameter and is expandable to a second diameter when the body is heated;
a tubular insert receivable into the axial chamber of the body; and
a retaining element having an outer diameter between the first diameter and the second diameter, the retaining element comprising an annular portion and a plug portion.

18. The kit of claim 17, wherein the plug portion is integral with the annular portion.

19. The kit of claim 17, wherein the plug portion is separate from the annular portion.

20. The kit of claim 17, further comprising a valve ball and a ball seat, the valve ball receivable into the tubular insert and the ball seat receivable into the axial chamber.

\* \* \* \* \*